(12) United States Patent
Proulx

(10) Patent No.: US 8,910,388 B2
(45) Date of Patent: *Dec. 16, 2014

(54) AERODYNAMIC TRIMMER HEAD FOR USE IN FLEXIBLE LINE ROTARY TRIMMERS

(75) Inventor: Richard A. Proulx, Alta Loma, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 755 days.

This patent is subject to a terminal disclaimer.

(21) Appl. No.: 13/033,564

(22) Filed: Feb. 23, 2011

(65) Prior Publication Data

US 2011/0214301 A1 Sep. 8, 2011

Related U.S. Application Data

(63) Continuation-in-part of application No. 12/717,908, filed on Mar. 4, 2010.

(51) Int. Cl.
*B26B 9/00* (2006.01)
*B26B 7/00* (2006.01)
*A01D 34/00* (2006.01)
*A01D 34/416* (2006.01)

(52) U.S. Cl.
CPC .......... *A01D 34/416* (2013.01); *A01D 34/4163* (2013.01); *A01D 34/4166* (2013.01)
USPC ............................... 30/276; 30/347

(58) Field of Classification Search
USPC ...................... 30/276, 347; 15/12.7
See application file for complete search history.

(56) References Cited

U.S. PATENT DOCUMENTS

| | | | | |
|---|---|---|---|---|
| 4,020,552 A | * | 5/1977 | Mizuno et al. | 30/276 |
| 4,052,789 A | * | 10/1977 | Ballas, Sr. | 30/276 |
| 4,557,052 A | * | 12/1985 | Baba et al. | 30/276 |
| 4,571,831 A | * | 2/1986 | White, III | 30/276 |
| 6,401,344 B1 | * | 6/2002 | Moore et al. | 30/347 |

* cited by examiner

*Primary Examiner* — Kenneth E. Peterson
*Assistant Examiner* — Samuel A Davies
(74) *Attorney, Agent, or Firm* — Holland & Knight LLP; Richard E. Lyon, Jr.

(57) ABSTRACT

An aerodynamic trimmer head for use in flexible line rotary trimmers having a plurality of aerodynamic elements defined by the upper and lower head surfaces that during rotation of the head, draw air downwardly about the trimmer drive mechanism onto the upper head surface and move the air outwardly from the head into the plane of the extended cutting line and at forward inclination in the direction of rotation. The downwardly moving air cools the trimmer drive mechanism and the outwardly and forwardly moving air reduces the drag on the head and the extended cutting line. The aerodynamic elements preferably include a plurality of troughs extending downwardly and forwardly along the upper head surface, a perimeter surface for deflecting air moved by the troughs into a generally horizontally extended zone of moving air about the extended cutting line and a plurality of dimples formed in a lower surface of the head.

23 Claims, 26 Drawing Sheets

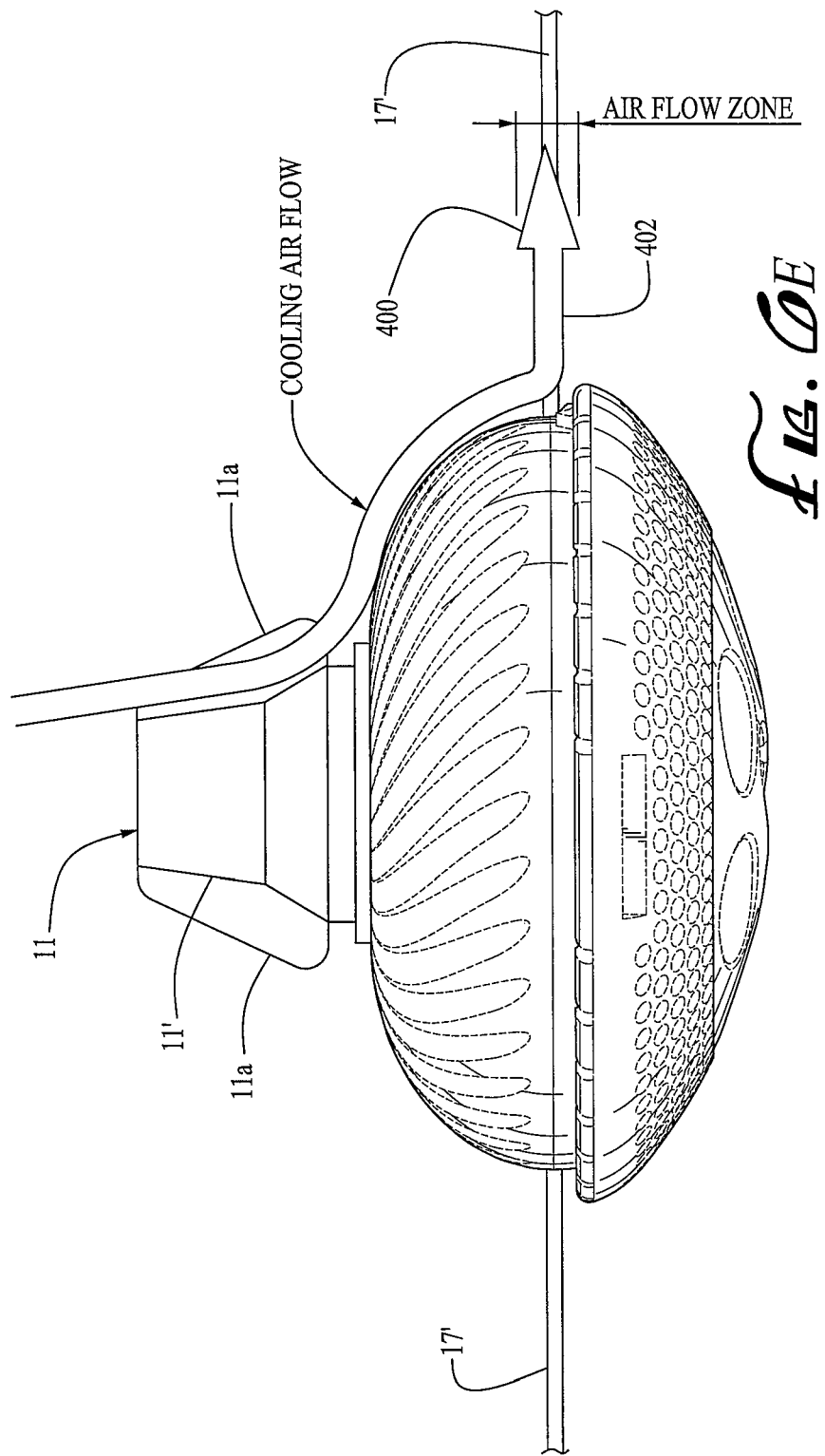

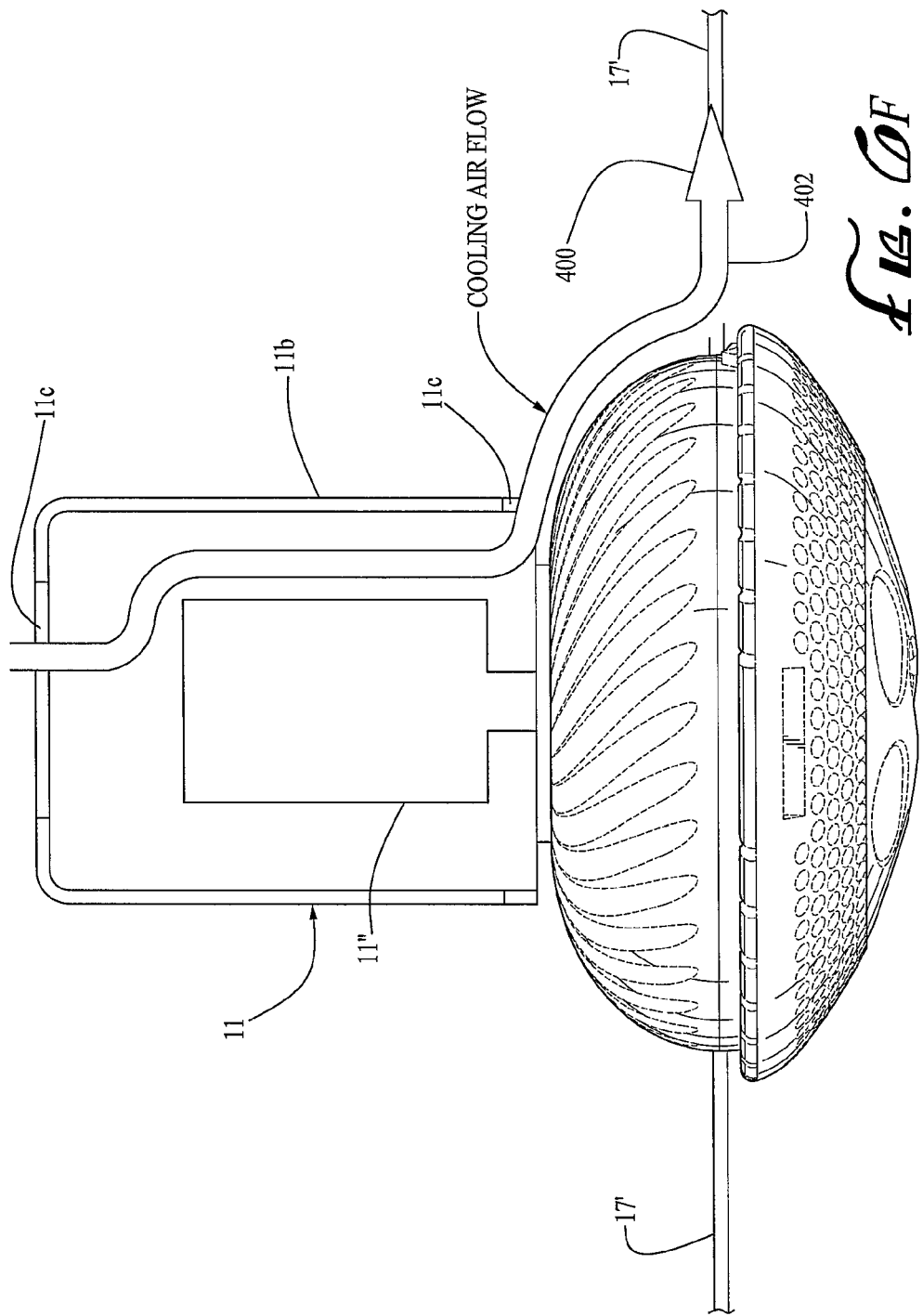

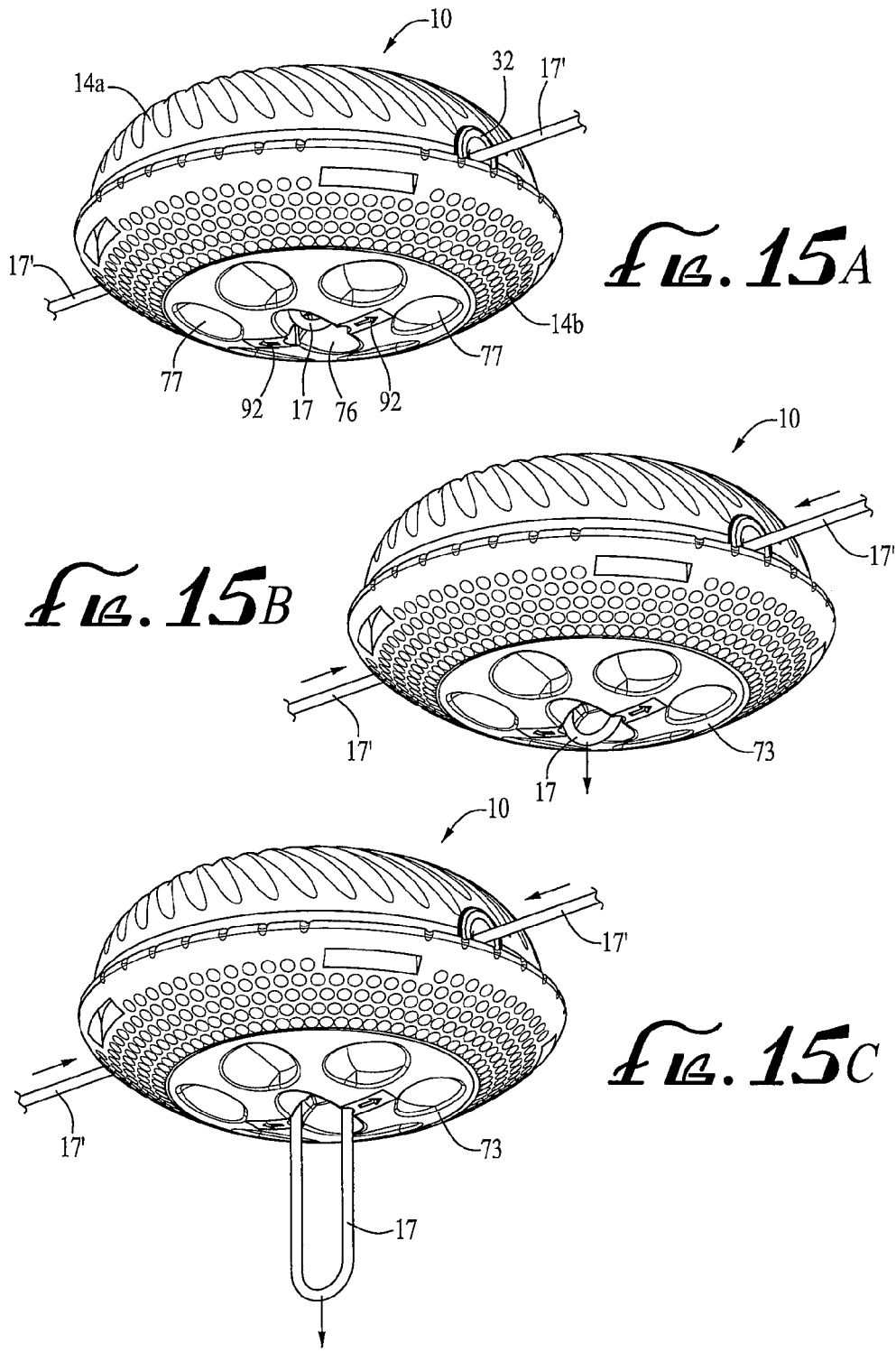

AERODYNAMIC TRIMMER HEAD FOR USE IN FLEXIBLE LINE ROTARY TRIMMERS

CROSS-REFERENCE TO RELATED APPLICATIONS

This application is a continuation-in-part of U.S. patent application Ser. No. 12/717,908, filed Mar. 4, 2010 entitled "Aerodynamic Trimmer Head For Use In Flexible Line Rotary Trimmers".

BACKGROUND OF THE INVENTION

The present invention relates to an improved trimmer head for use in flexible line rotary trimming devices used to trim grass, weeds and other vegetation. More particularly, the invention is directed to an improvement in the aerodynamics of the trimmer head so that with the same drive input, the head will rotate faster than a conventional trimmer head, enhancing the cutting efficiency of the rapidly rotating cutting line or rotate at the same speed as a conventional head with less drive input, saving energy. The improved aerodynamics of the head in the present invention also has been found to reduce vibration and noise during use.

Trimmer heads used in flexible line rotary trimmers generally carry one or two lengths of flexible nylon cutting line typically wrapped about an interior spool with the ends of the line or lines projecting outwardly through opposed apertures in the side wall of the trimmer head. The head is threadably mounted on the end of an elongated shaft and rotated at a high velocity by a gas or electric motor so that the ends of the cutting line project radially from the head and sever weeds or other vegetation. When cutting line projecting from the head breaks off or becomes overly worn, it must be severed and fresh line extended from the spool through the line outlet eyelets in the side of the housing. Bump-feed type heads such as those disclosed in U.S. Pat. Nos. 4,458,419, 4,959,904 and 6,901,667, include a line feed-out mechanism which responds to the operator intentionally bumping the rotating head against the ground during use to feed out a measured length of fresh cutting line which is typically cut to the desired length by a knife blade projecting from a shield attached to the trimmer above the cutting head and spaced a predetermined distance from the perimeter of the trimmer head housing. Manual heads such as that disclosed in U.S. Pat. No. 7,275,324, do not include any such line feed-out mechanism. The spool must be manually rotated relative to the housing to pay out additional cutting line. Automatic heads such as that disclosed in U.S. Pat. No. 5,063,673, include a mechanism that detects a loss of mass in the cutting line projecting from the head during use and, without the need for any action by the operator, pay out additional lengths of line from the spool through the eyelets. Fixed line heads such as that disclosed in U.S. Pat. No. 6,928,741, utilize one or more relatively short lengths of cutting line, typically under 12 inches in length, that project from the trimmer head housing and are held proximate their inner ends by a line gripping mechanism disposed within the housing. The improvement of the present invention is adaptable for use with each of these types of head to improve the efficiency thereof and reduce noise and vibration.

SUMMARY OF THE INVENTION

Briefly, the present invention is directed to an improved trimmer head for use in flexible line rotary trimmers that is more efficient and generates less noise and vibration than conventional trimmer heads. The trimmer head of the present invention comprises a low profile housing, preferably of a generally elliptical configuration. A spool for carrying one or more lengths of cutting line can be mounted within the housing and preferably configured such that the lower spool surface is generally curvilinear and merges smoothly into the contour of the lower portion of the trimmer head. The outer surfaces of the upper and lower portions of the head define aerodynamic features in the form of surface irregularities therein configured to enhance the aerodynamics of the trimmer head and reduce the drag on the head and line during use.

In a preferred embodiment of the present invention, the outer surface of the upper portion of the housing is provided with a plurality of coordinated arcuate troughs angularly disposed therein so as to draw air downwardly, during use, about the central axis of rotation of the trimmer head and onto the upper surface of the head where the air is moved outwardly and downwardly therefrom by the troughs at a forward inclination in the direction of rotation of the head and into the plane of the rotating cutting line. The downward air flow will pass about the gear box in a gasoline powered rotary trimmer, cooling the gears, or about the motor and batteries in the case of an electric powered trimmer, cooling and prolonging the life thereof. Directing air into the plane of the rotating line in the direction of rotation reduces the relative velocity between the air and the line, reducing the drag on the line. The aerodynamic features also preferably extend about the periphery of the housing below the level of the line outlet apertures in the side of the head to cooperate with the arcuate troughs and direct the air flow generated by the troughs into a substantially horizontal flow from the head so as to maintain the forwardly directed air flow in and about the plane of the extended cutting line, further decreasing the drag on the line and maintaining the extended rotating line in a substantially horizontal disposition to provide an even cutting of the vegetation and reduce the vibration of the line and the noise generated thereby.

The outer surface of the lower portion of the housing preferably is provided with a plurality of patterned dimples therein to break up the air boundary adjacent the lower housing surface reducing the areas of laminar flow adjacent to the head and thereby reducing the drag on the lower housing surface and the overall drag on the head. The volume of air movement effected by the dimples is quite small so as to reduce the drag on the lower portion of the rotating trimmer head without disturbing the vegetation below the head sufficiently to impair uniform cutting thereof.

BRIEF DESCRIPTION OF THE DRAWINGS

FIG. 6E is a side view of the trimmer head shown in FIGS. 1-6C illustrating the downward air flow about the trimmer head drive mechanism on a gasoline powered rotary trimmer and the elevation and thickness of the outwardly and forwardly moving zone of air generated by the head during rotation thereof.

FIG. 6F is a side view of the trimmer head shown in FIGS. 1-6C illustrating the downward air flow about the trimmer head drive mechanism on an electric powered rotary trimmer and the elevation and thickness of the outwardly and forwardly moving zone of air generated by the head during rotation thereof.

FIG. 15A is a perspective view of the trimmer head shown in FIGS. 1-6C as seen from below and with the cutting line loaded thereon.

FIG. 15B is a perspective view of the trimmer head shown in FIGS. 1-6C as seen from below and illustrating the cutting line as it begins to be withdrawn from the lower open portion of the line receptor channel.

FIG. 15C is a perspective view of the trimmer head shown in FIGS. 1-6C as seen from below and illustrating the cutting line as it further withdrawn from the lower open portion of the line receptor channel.

DETAILED DESCRIPTION OF THE PREFERRED EMBODIMENTS

Figure 1:
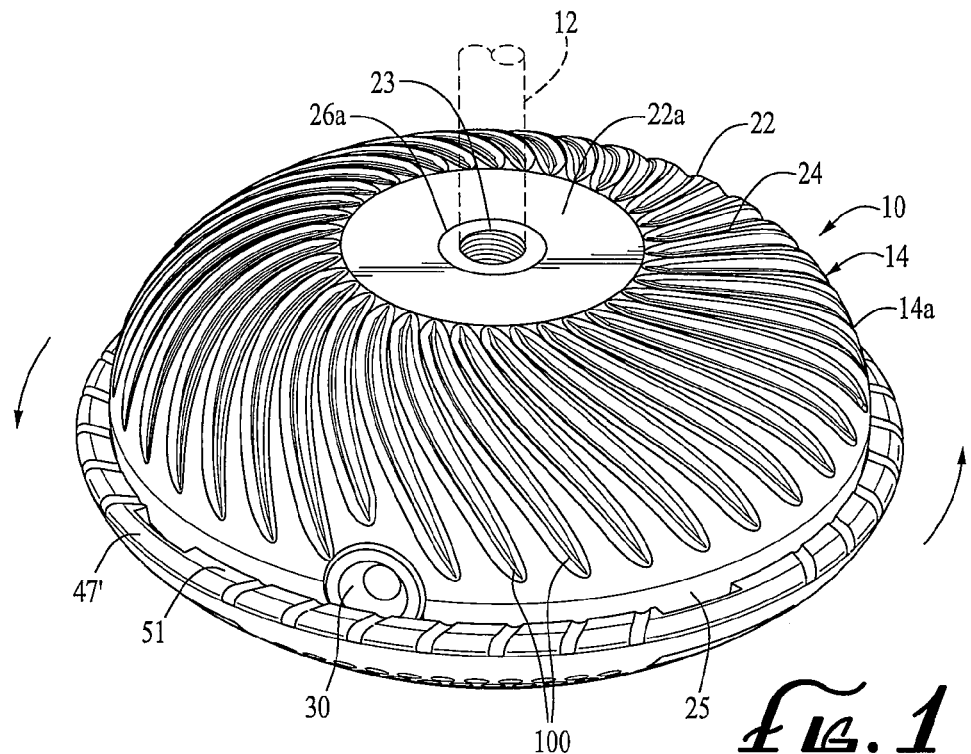
FIG. 1 is a perspective view of a first embodiment of the trimmer head of the present invention as seen from above.

Referring now in detail to the drawings, a first embodiment of a trimmer head 10 embodying the teachings of the present invention is illustrated in FIGS. 1-18B. Trimmer head 10 is a bump-feed type and is designed to be mounted on the extended end of a rotatable drive shaft 12 on a gasoline or electric powered rotary trimmer (not shown). Trimmer head 10 comprises a housing 14, spool 16, coil spring 18 and drive bolt 20. The housing comprises an upper portion 14a and a lower portion 14b that are releasably secured together about the spool 16. The drive and line feeding mechanism employed in trimmer head housing 10 is similar to that disclosed in detail in U.S. Pat. No. 4,959,904 and the rapid line loading and line replacement mechanism employed in trimmer head 10 is disclosed in U.S. Pat. No. 7,797,839. However, the aerodynamic profile of the head 10 and the cooperative aerodynamic elements defined by the exterior surfaces of the head are novel. While primarily described below in connection with a bump-feed type head having the above noted line drive, feeding, loading and replacement features, the aerodynamic features of the present invention can be employed in trimmer heads having a wide variety of drive configurations, line feeding mechanisms and line loading and replacement systems.

In the illustrated embodiment of trimmer head 10, the housing 14 is of a slightly flattened, generally ellipsoidal configuration so as to define a relatively low profile aerodynamic shape. By way of example, a trimmer head embodying the present invention and having the same configuration as trimmer head 10 defines a maximum height H of 2.750 inches and a diameter D of 5.600 inches. The upper portion 14a of the housing is perhaps best illustrated in FIGS. 7A, 7B, 17A and 17B and includes an outer surface 22 defining a generally flat upper annular area 22a extending about and projecting radially from a central opening 23 disposed about the central axis of rotation of the trimmer head. Area 22a can include printed indicia thereon and merges at its outer perimeter into an annular curvilinear surface 24 extending outwardly and downwardly and terminating at its lower end in a more gradually curved skirt portion 25 extending slightly past vertical as seen, for example, in FIG. 17B.

The interior of the upper portion 14a of the housing defines a centrally disposed depending tubular extension 26 axially aligned with the central axis of rotation of the head. Tubular extension 26 circumscribes an axial channel 26' extending downwardly from the central opening 23 in the housing surface and defining a cylindrical upper channel portion 26a and a hexagonal lower portion 26b. Channel 26' is configured to receive the drive bolt 20 in a mating configuration with the upper cylindrical portion 20a of the bolt being disposed in the upper cylindrical portion 26a of the channel and the hexagonal lower portion 20b of the bolt being disposed in the lower hexagonal portion 26b of the channel. The lower portion of the drive bolt and the tubular extension in the housing could also be square or otherwise configured to provide the desired interference fit between the drive bolt and housing.

The drive bolt 20 preferably is secured within the tubular extension by utilizing the natural shrinkage of extension 26 during the cooling of the freshly molded head 10 about the bolt. The upper and lower portions of the trimmer head housing 14 are preferably molded of a plastic material with a polyamide (nylon 6), 15% glass reinforced material being most preferred. Objects molded of such materials will shrink as the freshly molded material cools. An annular groove 20c can be provided in the drive bolt to enhance the interference fit between the bolt and housing upon the shrinkage of the freshly molded plastic housing material about the bolt and thereby to enhance the securement of the bolt to the housing. Other means for securing the drive bolt to the housing also could be employed. The drive bolt 20 may define an internally threaded cylindrical bore 20d extending axially therethrough for threaded engagement with the drive shaft of the trimmer.

The upper portion of housing 14 also defines a pair of opposed slots 30 in the housing skirt 25. The slots are open at their lower ends and are adapted to receive a pair of opposed metal outlet eyelets 32 in a press fitment. Perimeter portions 33 of the slots are radiused so that the outer ends of the eyelets fit substantially flush with the outer surface of the housing. A plurality of equiangularly disposed and outwardly projecting radial tabs 36 also are provided at the lower end of the skirt portion 25 of the housing for the securement of the lower housing portion 14b to the upper portion 14a, as will be described.

While the present invention is described herein in connection with trimmer heads in which the cutting line exits the head through opposed openings, the aerodynamic features of the present invention are equally applicable for use on trimmer heads having a single line outlet opening. Such heads are in widespread use on low end rotary trimmers wherein adequate torque is generally lacking and improved aerodynamics in the heads would be very beneficial.

Figure 7A:
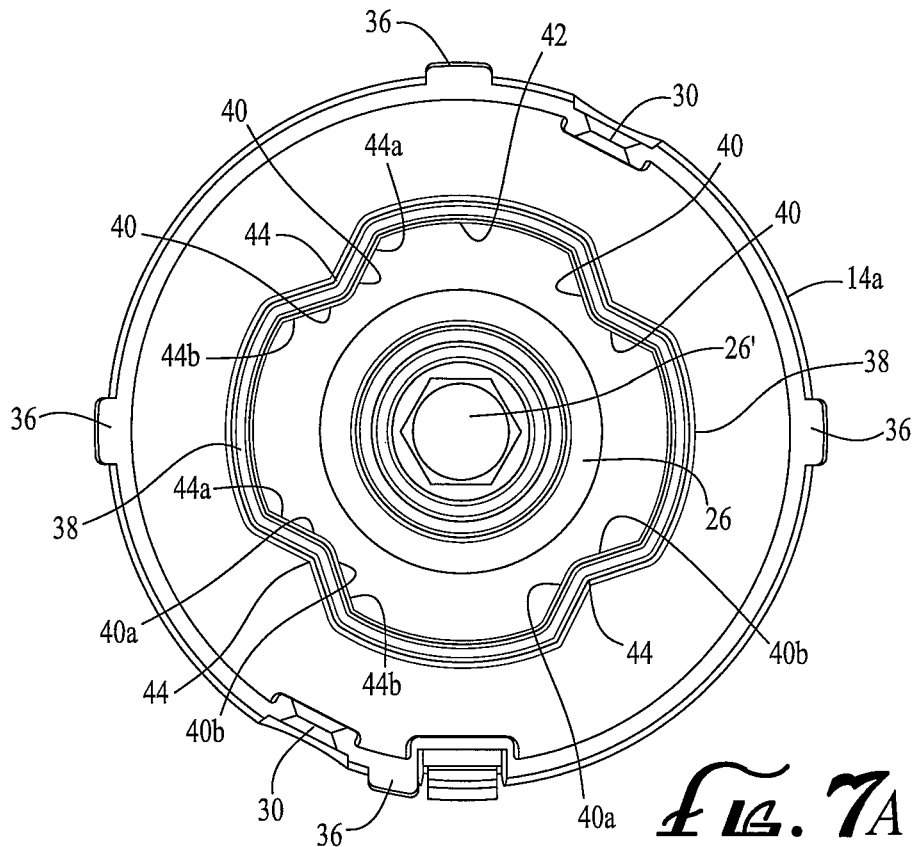
FIG. 7A is a bottom plan view of the interior of the upper portion of the housing of the trimmer head shown in FIGS. 1-6C.
Figure 7B:
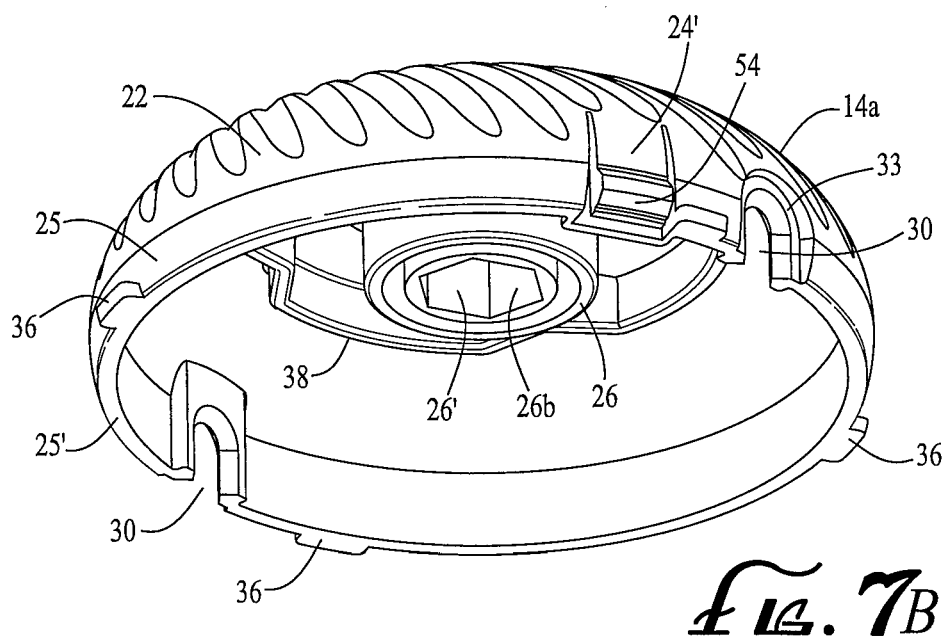
FIG. 7B is a perspective view of the interior of the upper portion of the housing of the trimmer head shown in FIGS. 1-6C.

The upper housing portion 14a additionally includes an interior depending vertical wall 38 outwardly spaced from tubular extension 26. As shown in FIGS. 7A and 7B, the wall 38 is configured to define four pair of inwardly angled surfaces 40, each pair forming a projection 44 that projects radially inwardly toward the central axis of rotation of the head at the center of tubular extension 26. Each pair of angularly disposed surfaces 40 are offset by 135° and extend parallel to the axis of rotation of the head. The projections 44 formed by surfaces 40 define cam surfaces wherein the leading edge of each of the projections 44 defines an upper cam 44a (assuming counterclockwise rotation of the head as seen from above the head) and the trailing surfaces on each projection define an upper slide surface 44b. The surface of each of the cams is again parallel to the axis of rotation of the head.

The lower housing portion 14b of the trimmer head 10 is perhaps best illustrated in FIGS. 8A, 8B, 18A and 18B and defines an outer arcuate inclined surface 45 circumscribing an enlarged central opening 46 and merging proximate its upper end at 45' into a slightly curved and more steeply inclined upper end portion 47. The uppermost surface of end portion 47 merges along a radiused surface 47' into an upper generally horizontal annular surface 47". The interior of the lower housing portion 14b includes an upstanding annular interior wall 48 that circumscribes central opening 46, an annular interior surface 43 that slopes upwardly from wall 48 to vertical surface 49 and an annular horizontal upper housing support surface 51 that extends radially outwardly from the upper end of surface 49 to a steeply inclined wall surface 53. Surfaces 51 and 53 are adapted to abut the lower end surfaces of the upper housing portion 14a upon the upper and lower housing portions being secured together.

Figure 8A:
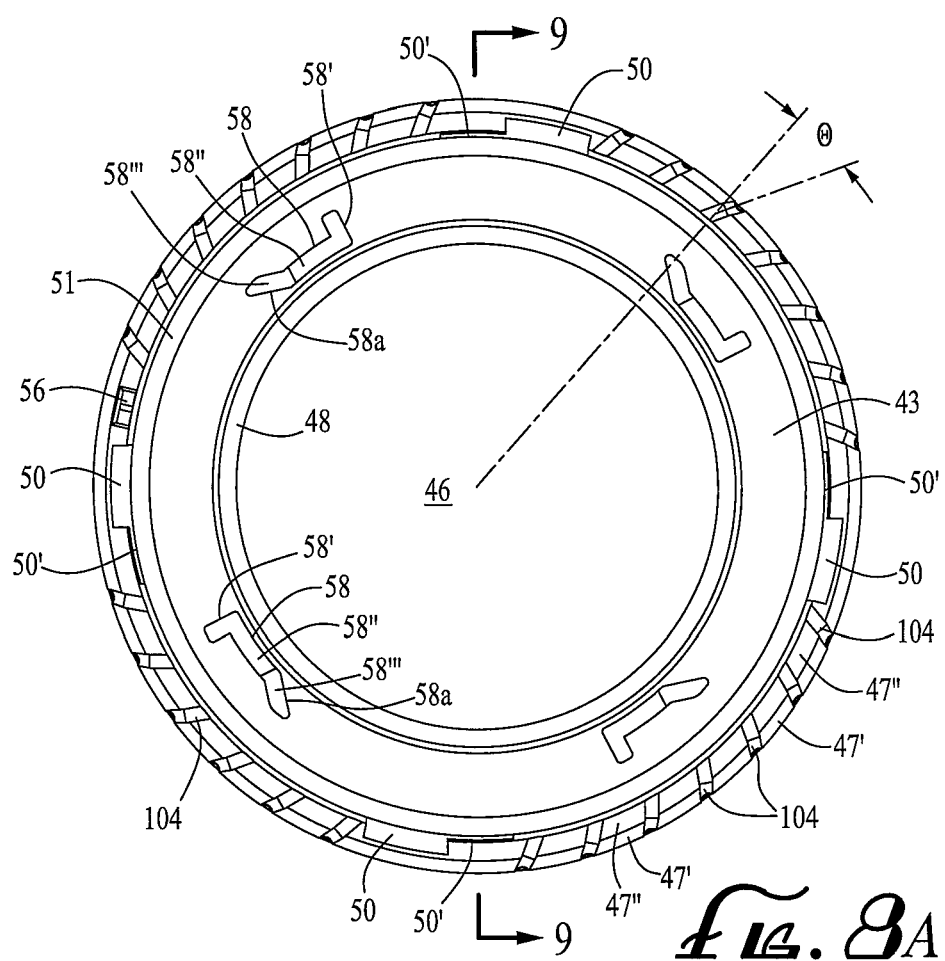
FIG. 8A is a top plan view of the interior of the lower portion of the housing of the trimmer head shown in FIGS. 1-6C.
Figure 8B:
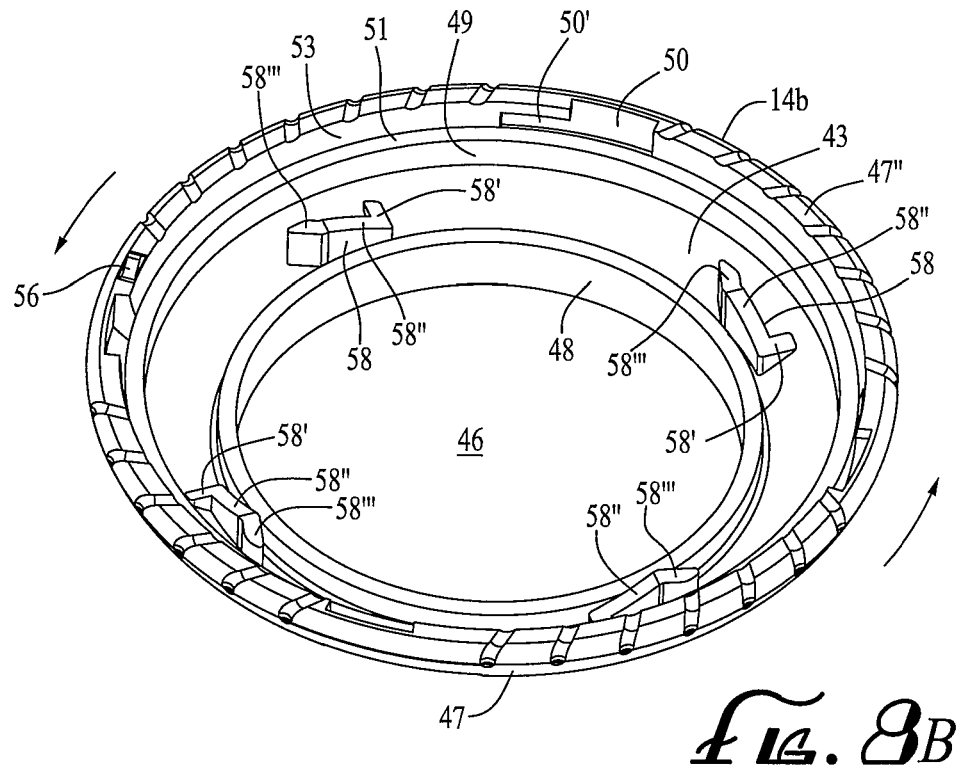
FIG. 8B is a perspective view of the interior of the lower portion of the housing of the trimmer head shown in FIGS. 1-6C.
Figure 9:
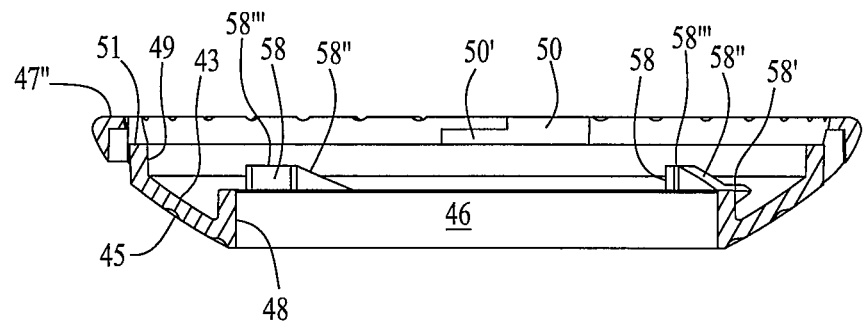
FIG. 9 is a cross-sectional view of the lower portion of the housing of the trimmer head taken along the line 9-9 in FIG. 8A.

A plurality of equiangularly disposed slots 50 (four being shown) are disposed in the lower portion of the housing for receiving a corresponding number of locking tabs 36 on the upper housing portion 14a. Slots 50 extend vertically through upper end portions of inclined surface 45 exteriorly adjacent the interior housing support surface 51 and are provided with narrow offset access portions 50' as seen in FIGS. 8A and 8B. To attach the upper housing portion 14a to the lower housing portion 14b, a locking tab 54 defined by a resilient cantilevered portion 24' of the upper housing portion 14a must first be aligned with a small protrusion 56 provided on the lower housing portion 14b. The user then inserts the four locking tabs 36 of the upper housing 14a into the four slots 50 in the lower housing portion 14b. The tab 54 is then pressed radially inwardly and the housing portions 14a and 14b are pressed together, mating together the upper housing portion 14a and the lower housing portion 14b such that the lower annular end surface 25' of the upper housing portion 14a is disposed on the annular support surface 51 in the lower housing portion 14b. The user then rotates the upper housing portion 14a counterclockwise with regard to the lower housing portion 14b, causing the locking tabs 36 to translate into the offset portions 50' of the slots 50. When the locking tabs 36 have translated completely into the offset portions 50', the tab 54 that had been pressed inwardly and then became biased outwardly against interior wall surface 53 upon the initiation of the rotation of the upper housing portion, now is aligned with one of the slots 50, allowing the cantilevered portion 24' of the tab to return to its original, unstressed extended position and project outwardly into the aligned slot, whereupon the upper housing portion 14a is securely attached to the lower housing portion 14b.

The lower portion 14b of the housing 14 also defines four equiangularly disposed, upstanding projections 58 on the interior annular surface 43 (see, e.g. FIG. 8B). Projections 58 each define a radially extending, upwardly inclined foot portion 58' at the trailing end thereof that merges into an inclined surface 58" which merges into an outwardly projecting portion 58'" at the leading end of the projection 58 (assuming counterclockwise rotation). The outwardly projecting portions 58'" of the projections 58 define vertical, angularly disposed walls 58a that function as lower cams as will be later described. The foot portions 58' and inclined surfaces 58" on the projections define lower slide surfaces and cooperate with lower cam follower surfaces formed on spool 16, as will be later described.

Figure 5:
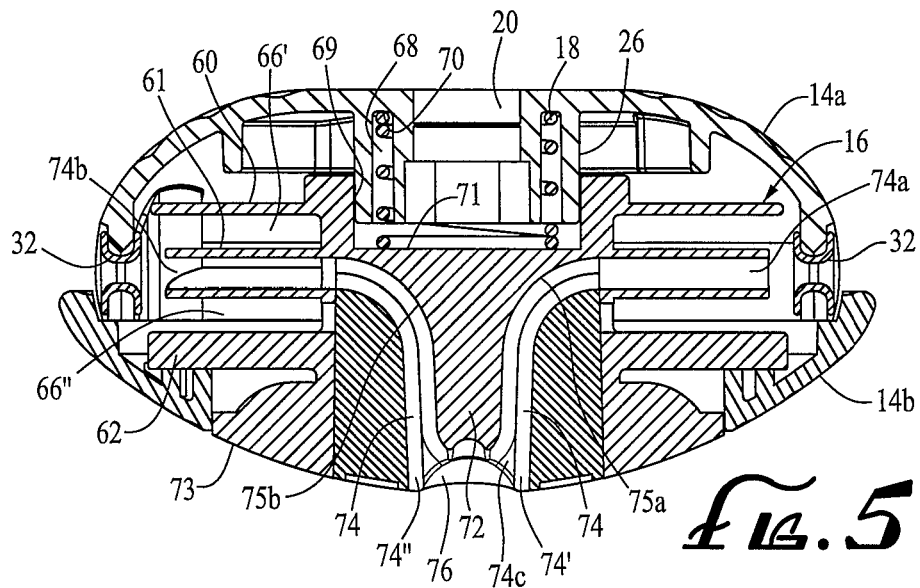
FIG. 5 is a sectional view of the embodiment of the trimmer head shown in FIGS. 1-4, illustrating the spool and trimmer head housing before the cutting line is loaded.
Figure 6A:
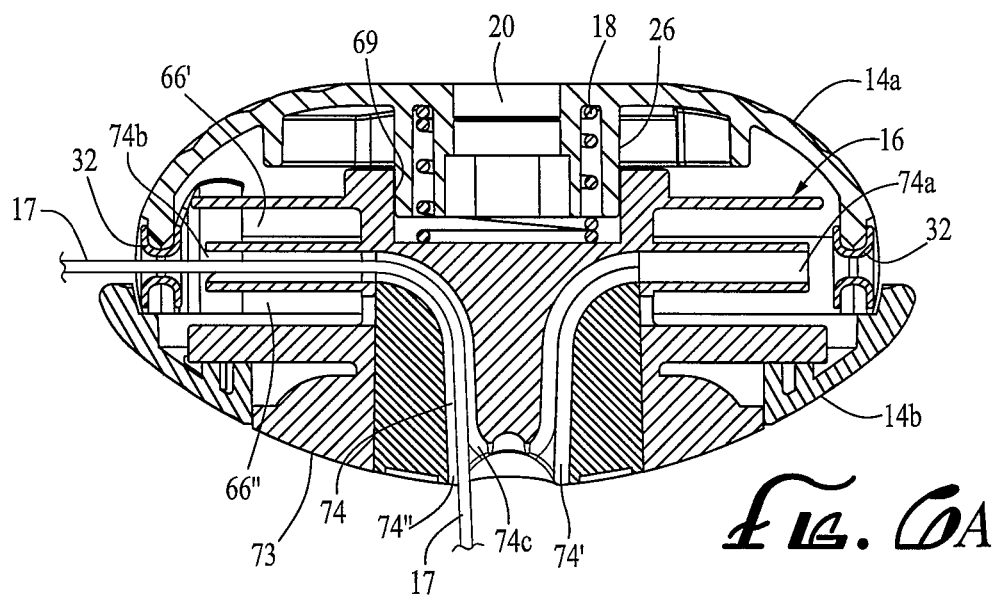
FIGS. 6A and 6B are sectional views of the trimmer head as shown in FIG. 5 illustrating the loading of the cutting line.
Figure 6B:
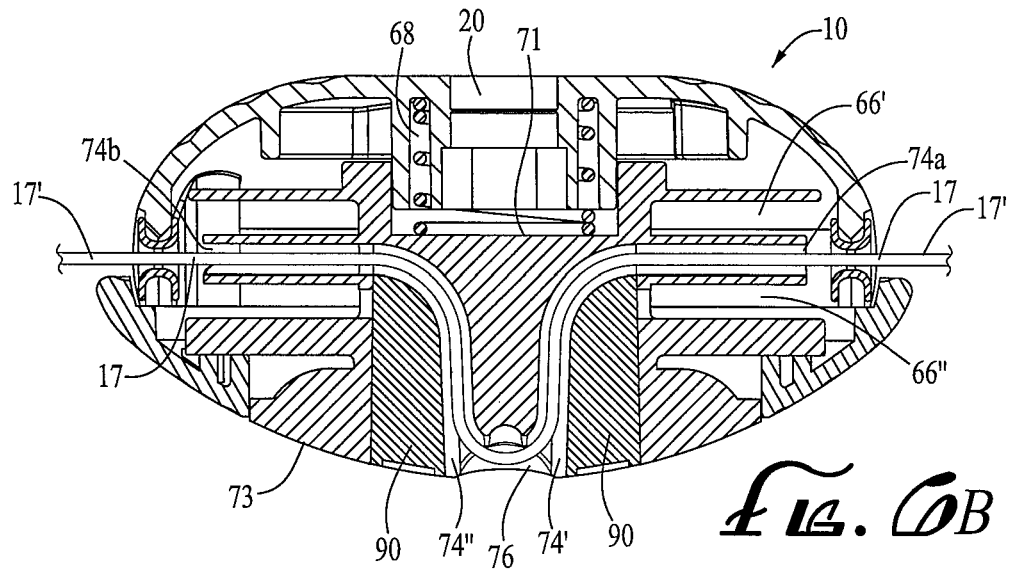
Figure 6C:
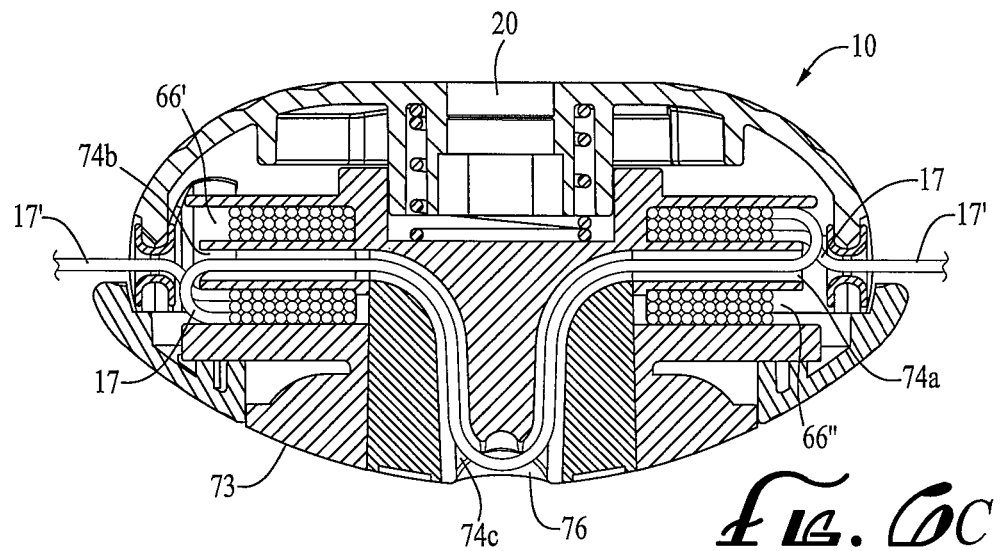
FIG. 6C is the sectional view of the trimmer head as shown in FIG. 5 with the cutting line wound thereon.
Figure 6D:
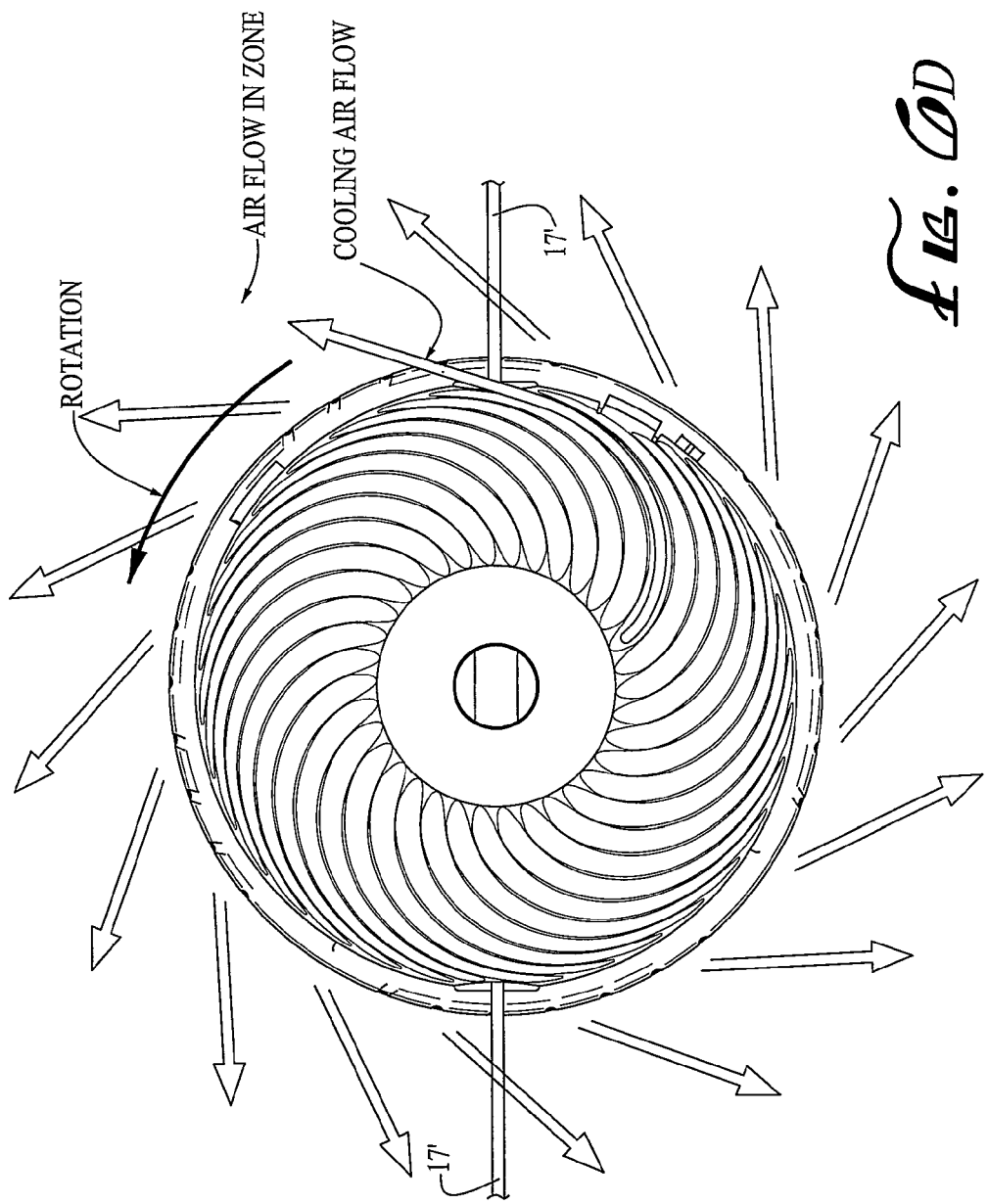
FIG. 6D is a top plan view of the trimmer head shown in FIGS. 1-6C illustrating the zone of outwardly and forwardly moving air generated by the head during rotation thereof.

The spool 16 in trimmer head 10 defines an upper flange 60, a middle flange 61 and a lower flange 62 carried by and projecting radially from a cylindrical body portion 64 so as to define two annular storage areas 66' and 66" between flanges 60 and 61, and between flanges 61 and 62, respectively, for carrying coils of flexible nylon cutting line 17 wrapped about body portion 64 such that upon assembly, the end portions 17' of the cutting line will extend outwardly through the opposed eyelets 32 (see FIGS. 6C-6E). An annular chamber 68 is provided in the depending tubular extension 26 in the interior of the upper housing 14a about the lower portion of the extension. Chamber 68 is open at its lower end and defines an upper spring abutment surface 70. A cylindrical chamber 69 having an open upper end is disposed about the central axis of rotation in the upper end of the spool and defines a lower spring abutment surface 71. When head 10 is assembled, the tubular extension 26 on the upper housing projects into chamber 69 in the spool and the coil spring 18 extends between and bears against the spring abutment surfaces 70 and 71 as seen in FIGS. 5 and 6. A lower portion 72 of spool 16 projects outwardly from body portion 64 and defines at its lowermost end a ground abutment surface 73.

As seen, for example, in FIG. 2 and as will be discussed later herein in more detail, the lowermost surface 73 of the spool 16 is generally curvilinear and is shaped so as to merge smoothly into the contour of the lower portion of the head as defined by arcuate surface 45 on the lower portion 14b of the housing so as to provide the trimmer head 10 with a relatively low profile and the lower portion of the head with a relatively smooth aerodynamic shape. Also, spool surface 73 is provided with a plurality of depressions or recesses 77 adapted to conveniently receive the fingers and thumb of the user for rotating the spool with respect to the trimmer head housing to load the cutting line onto the spool without interrupting the operative connection between the spool and the housing as also will be later described.

Spool 16 preferably defines a line receptor channel 74 extending therethrough from a first open end 74a to a second opposed open end 74b and having an open accessible portion 74c therebetween. In trimmer head 10, the opposed openings 74a and 74b of the line receptor channel 74 are located in the middle flange 61 and when the spool 16 is secured within housing 14, the channel openings are radially aligned with the eyelets 32 in the upper housing 14a (see, e.g., FIGS. 5 and 6), enabling the cutting line 17 to be inserted into the line receptor channel through one of the eyelets 32 without having to remove the spool from the housing. The line receptor channel 74 extends radially inwardly from the opposed channel openings 74a and 74b through flange 61, turns downwardly at 75a and 75b in relatively wide radius curves and extends downwardly through opposed interior portions of the lower spool body portion 72, outwardly through laterally spaced openings 74' and 74" in a lower recessed area 76 in the lowermost surface 73 of the spool and transversely across a recessed area 76 in the spool surface 73, interiorly of the gripping recesses 77 formed therein. The portion of channel 74 extending across the lower recessed area 76 of the spool is the open or exposed portion 74c of the channel providing access to the portion of cutting line 17 extending therethrough. Channel portion 74c preferably is defined by a concave surface or is of an inverted U-shaped configuration to assist in guiding the cutting line through the lower recessed portion 76 of the spool. Recessed area 76 extends transverse to channel portion 74c to facilitate gripping of the cutting line extending thereacross and protect the exposed line in channel portion 74c during use.

Figure 3:
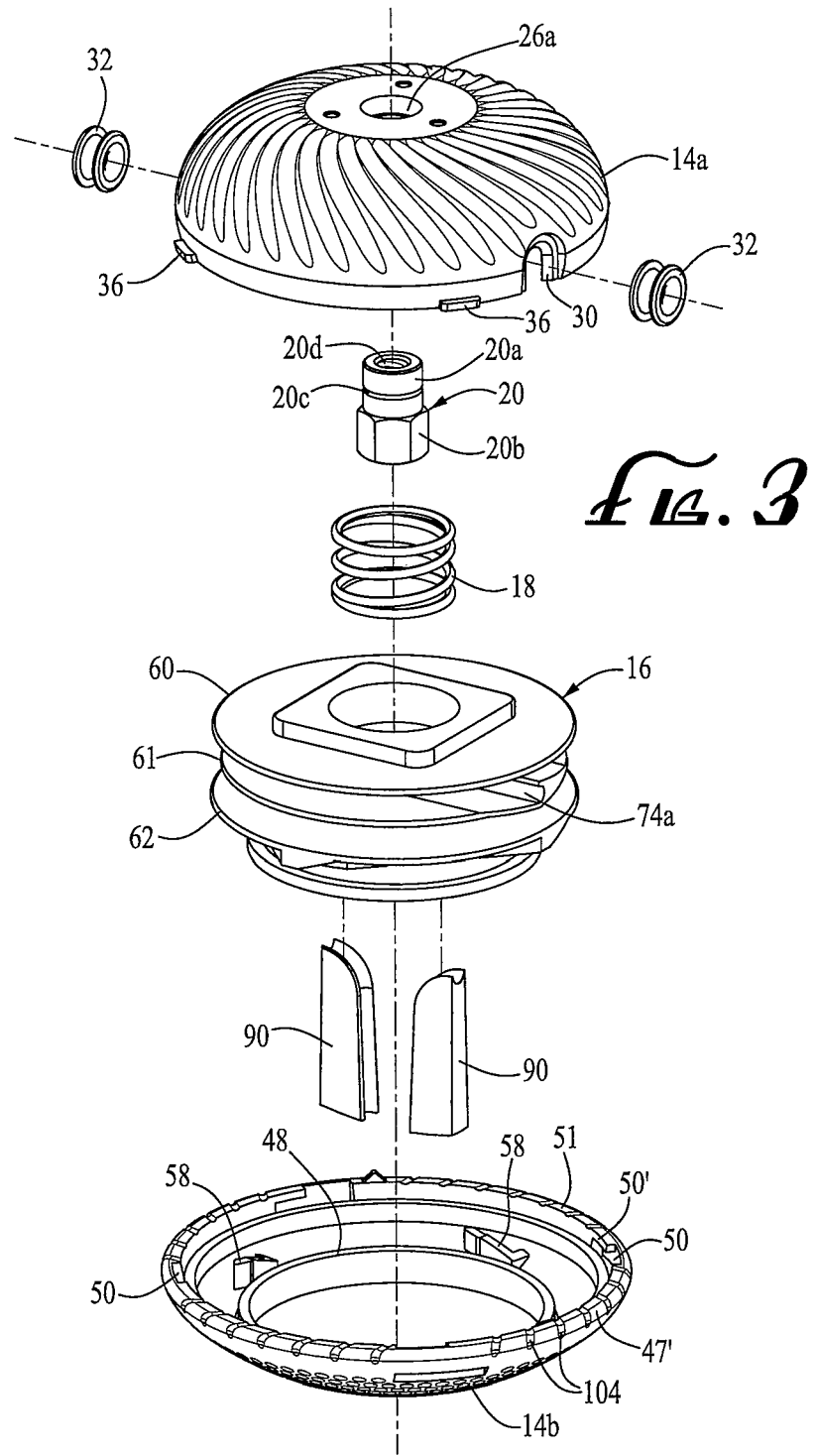
FIG. 3 is an exploded perspective view as seen from above of the various elements comprising the embodiment of the trimmer head of the present invention illustrated in FIG. 1.
Figure 4:
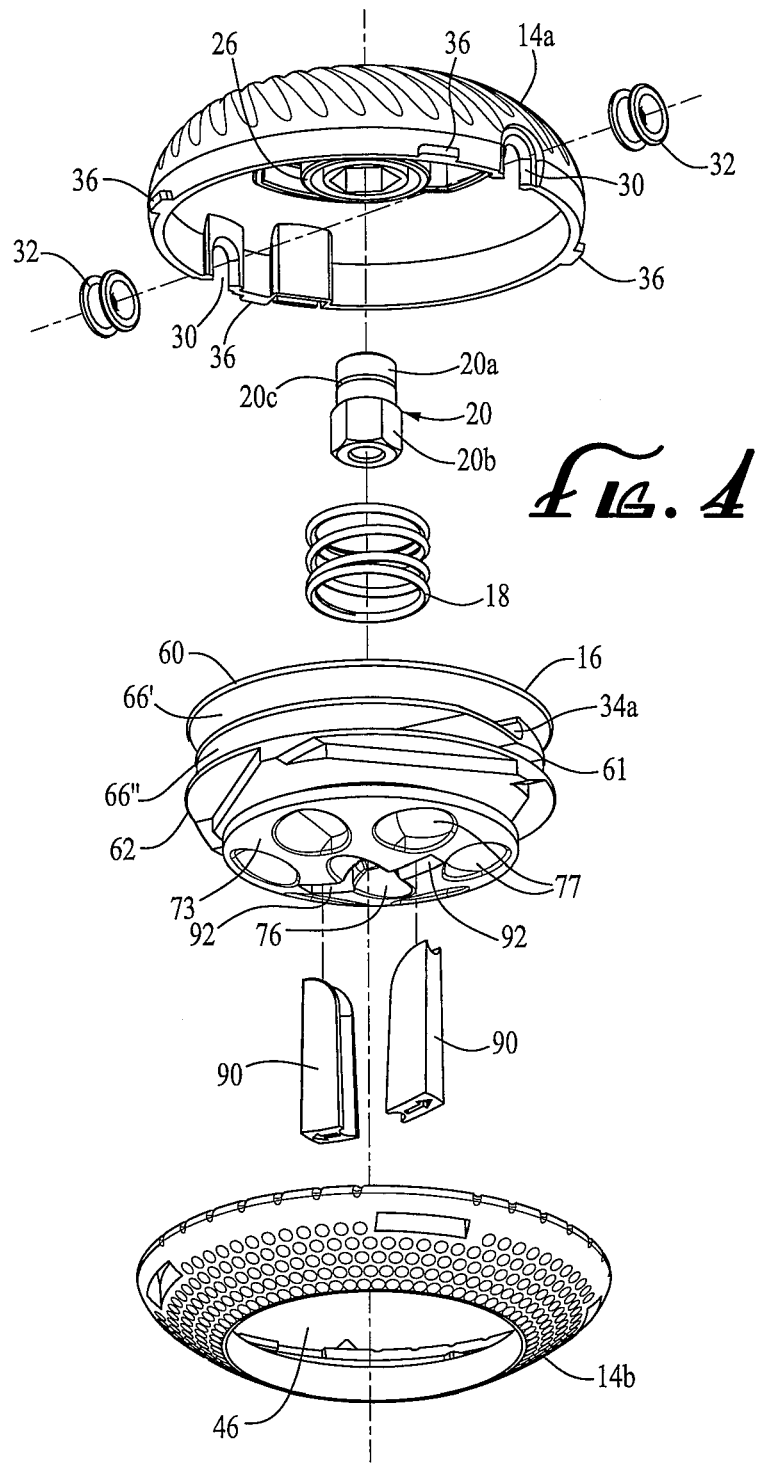
FIG. 4 is an exploded perspective view of the various elements comprising the first embodiment of the trimmer head similar to FIG. 3 but as seen from below.
Figure 10A:
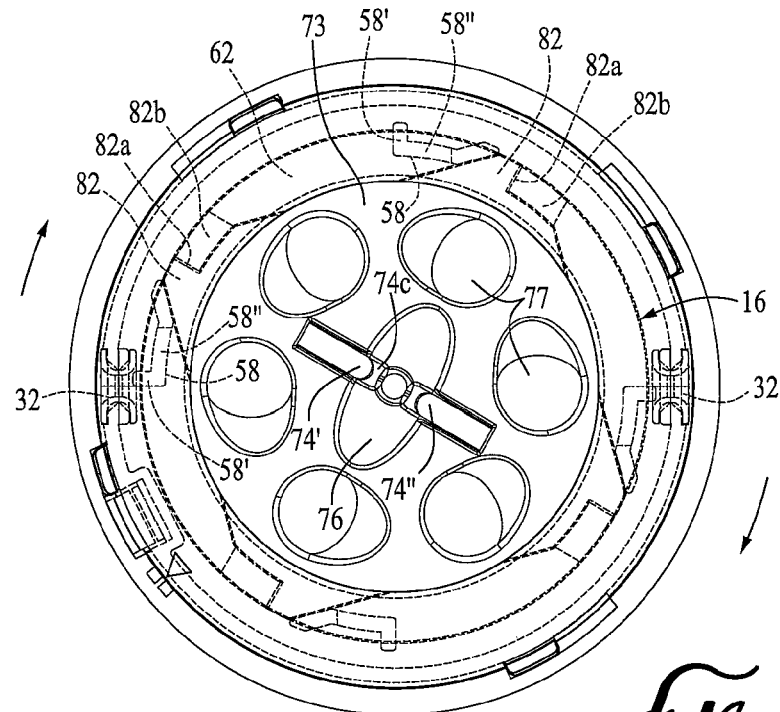
FIG. 10A is a bottom plan view of the trimmer head shown in FIGS. 1-6C in the drive mode showing the relative positioning of the lower cam followers on the spool with respect to the lower cams on the housing wherein the lower cam followers and cams are shown in dotted lines.
Figure 10B:
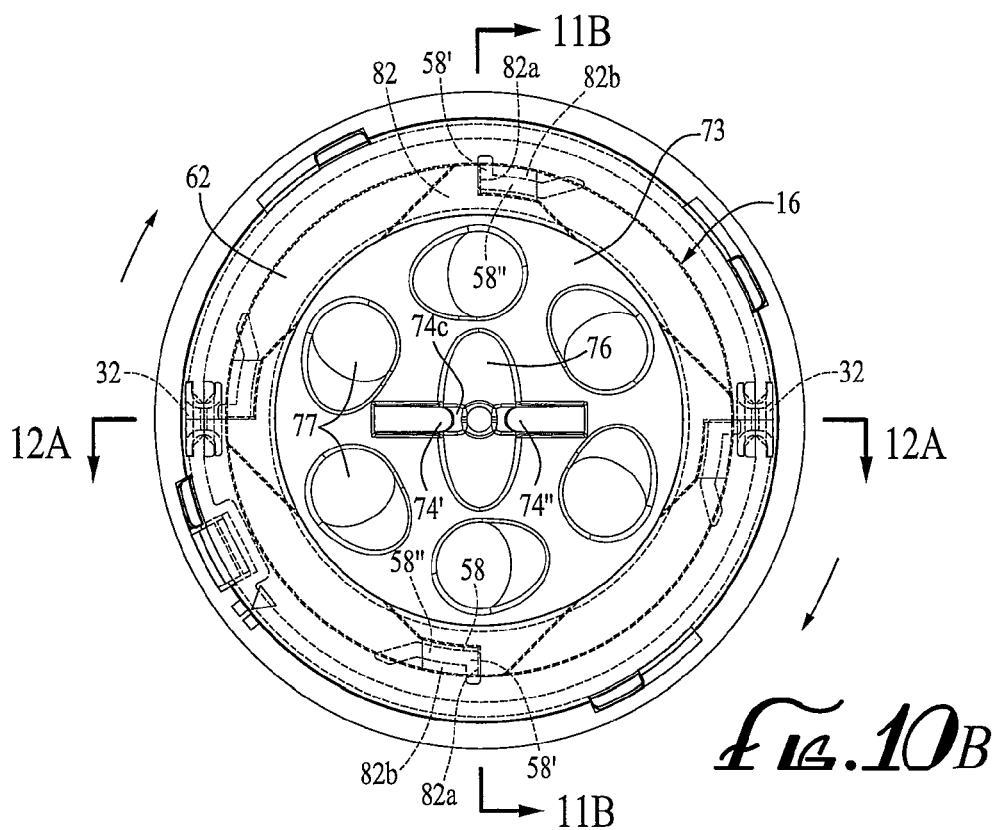
FIG. 10B is a bottom plan view of the trimmer head shown in FIGS. 1-6C in the line winding mode showing the relative positioning of the lower cam followers on the spool with respect to the lower cams on the housing wherein the lower cam followers and cams are shown in dotted lines.
Figure 11A:
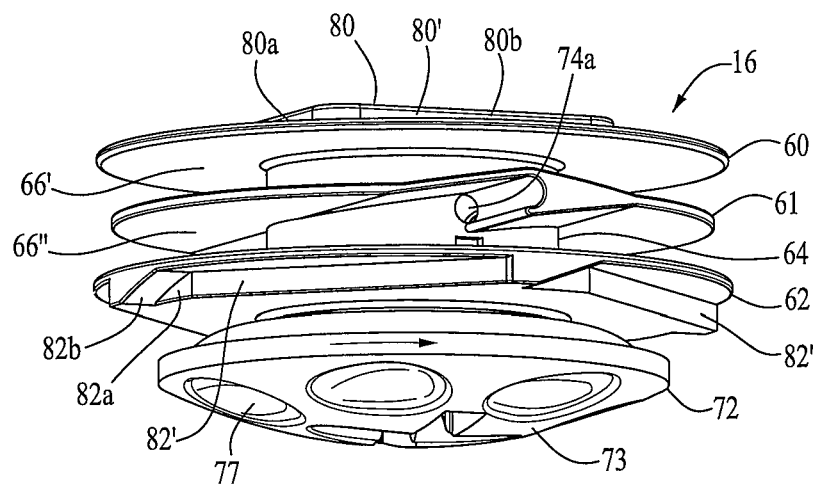
FIG. 11A is a perspective view of the spool of the trimmer head shown in FIGS. 1-6C.
Figure 11B:
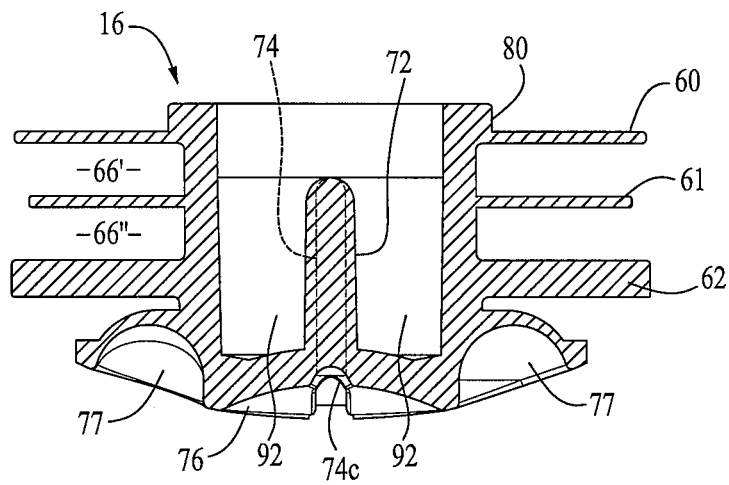
FIG. 11B is a cross-sectional view of the spool of the trimmer head shown in FIGS. 1-6C and is taken along the line 11B-11B in FIG. 10.
Figure 12A:
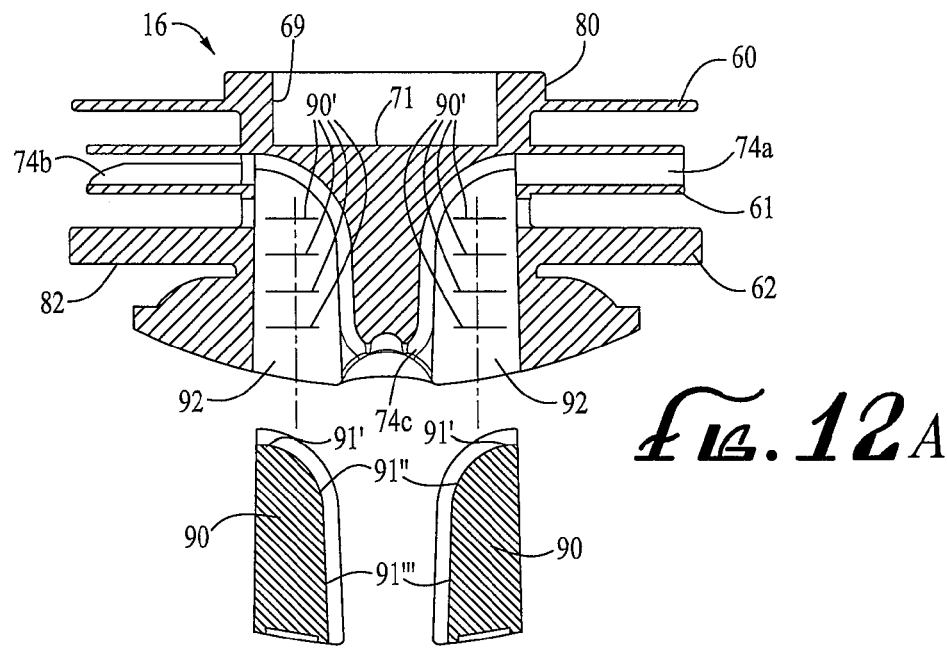
FIG. 12A is a cross-sectional exploded view of the spool of the trimmer head shown in FIGS. 1-6C as viewed along the line 12A-12A in FIG. 10 but prior to the insertion of the channel-forming inserts to illustrate an economical method of forming the spool.
Figure 12B:
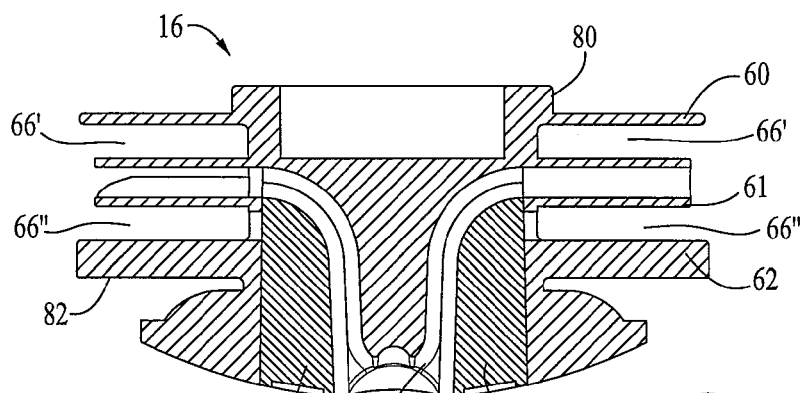
FIG. 12B is a cross-sectional view of the spool of the trimmer head shown in FIGS. 1-6C and is taken along the line 12A-12A in FIG. 10 illustrating the spool with the channel-forming inserts installed.
Figure 12C:
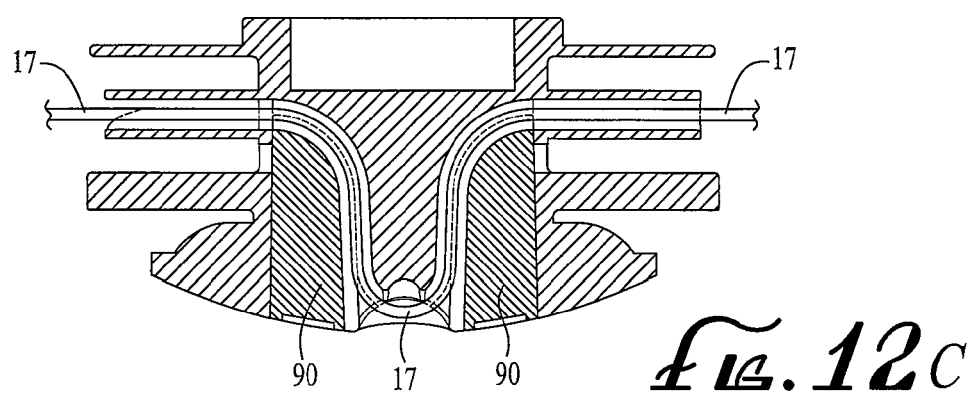
FIG. 12C is a cross-sectional view of the spool of the trimmer head shown in FIGS. 1-6C and is taken along the line 12A-12A in FIG. 10 illustrating the spool with the channel-forming inserts installed and with the cutting line extending through the line receptor channel in the spool.
Figure 12D:
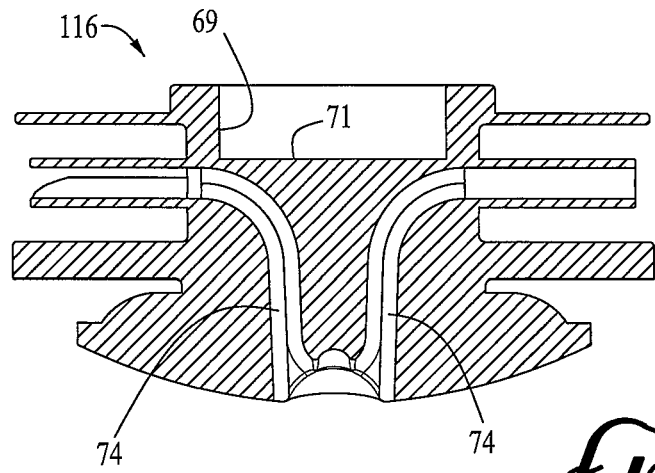
FIG. 12D is a cross-sectional view of a spool for use in the embodiment of the trimmer head shown in FIGS. 1-6C and is of single-piece construction.
Figure 13:
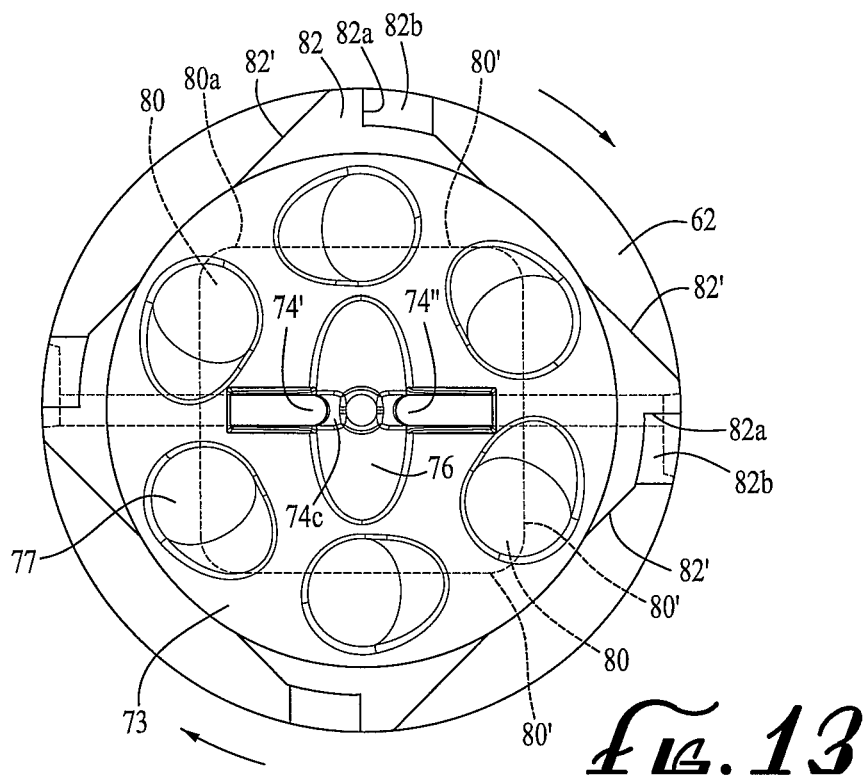
FIG. 13 is a bottom plan view of the trimmer head shown in FIGS. 1-6C showing the relative positioning of the upper cam follower with respect to the lower cam follower and with the upper cam follower and line openings being shown in dotted lines.

The upper flange 60 on spool 16 defines an upper cam follower 80 on its upper surface and the lower spool flange 62 defines a lower cam follower 82 on its lower surface as seen in FIGS. 3, 4, and 11A. While other configurations could be employed, both cam followers are preferably of a square configuration, defining four perpendicular surfaces 80' and 82' respectively, and are offset by 45° with respect to the central axis of rotation of the trimmer head. The cam abutment surfaces 80a and 82a defined by the trailing surfaces of the upper and lower cam followers are again parallel to the axis of rotation of the head. The leading surfaces of the lower cam follower which define sliding surfaces 82b may be inclined upwardly proximate the corners thereon so as to provide smoother ratcheting if needed. Also, the leading surfaces of the upper cam follower may also be inclined downwardly to facilitate line feeding. Such a downward inclination of the trailing surfaces is particularly preferable on the smaller heads where the length of each of the cam follower surfaces is shorter which otherwise might make the relative rotation of the spool and housing during line winding more difficult. It may also prove desirable to incline the trailing surfaces of the upper and lower cams. In the preferred configuration, the sliding surfaces 82b on the lower cam follower are defined by inclined ramps as seen in FIGS. 10A, 10B and 13 to provide a smoother ratcheting of the spool during the winding of the cutting line thereon due to the more gradual incline than that which would be provided by radiused surfaces.

During use in the drive mode, the lower cams 58a on the lower housing portion 14b are aligned with and abut the lower cam abutment surfaces 82a on the trailing surfaces of the lower cam follower 82 (see FIG. 10A). The configuration of projections 58 provides a relatively large contact area for cams 58a. Accordingly, as the housing is rotated in a counterclockwise direction by the trimmer drive, the spool is rotated with the housing. In this drive position, the upper cams 44a are upwardly spaced from upper cam follower 80 so that the driving force is generated solely by the lower cams. When the lowermost surface 73 of the spool is pressed or bumped against the ground, the spool 16 is forced upwardly within the housing, disengaging the lower cam abutment surfaces 82a on the lower cam follower from the lower cams 58a and bringing the upper cam abutment surfaces 80a on the upper cam follower 80 into alignment and immediate abutment with the upper cams 44a on the upper portion 14a of the housing 14 whereupon the driving force is effected solely by the upper cams. When the lower spool surface 73 is lifted from the ground, the coil spring 18 forces the spool downwardly, disengaging the upper cam follower from the upper cams and re-engaging the lower cam follower with the lower cams. With the first embodiment of the invention, with each bump on the ground effects a relative rotation of the spool and housing of 90° results, regardless of the duration of the bump. During this relative rotation, centrifugal force causes a predetermined amount of fresh cutting line to be paid out through the opposed eyelets 32 in the trimmer head housing.

To load the cutting line 17 about spool 16, the opposed open ends 74a and 74b of the receptor channel 74 are aligned with the eyelets 32 such that a single length of cutting line 17 can be inserted through one of the outlet eyelets 32 of the upper housing portion 14a and into and through the adjacent aligned open end 74a or 74b of the receptor channel 74. Printed indicia, such as the arrows 92 illustrated in FIG. 15A, can be provided on the outer surface of the lower housing portion 14b and in the recessed area 76 in the lower end of the spool to facilitate proper alignment of the line receptor channel with the eyelets 32 in the housing skirt. As the cutting line is pushed into the line receptor channel 74 through, for example, open end 74b, the end portion of the line passes about the curvilinear channel portion 75b and downwardly through the channel and out the opening 74" in the recessed area 76 in the lower end of the spool as illustrated in FIG. 6A. The end portion of the line projecting through opening 74" can then be readily grasped and pulled downwardly, causing more of the cutting line to be drawn inwardly through the eyelet and the adjacent portion of the line receptor channel 74. The downwardly extending end portion of the line is then redirected inserted back up through lower opening 74' and pushed upwardly through the remainder of the channel 74 and out through the other channel end 74a and the aligned eyelet. As the cutting line is pushed upwardly through the lower channel opening 74', it is drawn along the exposed transverse portion 74c of the channel and is directed by the surrounding channel wall outwardly through the channel 74 and to and through the adjacent eyelet to the position illustrated in FIG. 6B.

The cutting line 17 continues to be pulled through the trimmer head 10 until the midway point on the length of cutting line 17 to be loaded onto the head 10 is disposed in the open or exposed portion 74c of the line receptor channel. In this position, approximately equal lengths of line project through each of the opposed eyelets 32. Alternatively, the two end portions of the length of cutting line to be loaded on the spool 16 could each be inserted through one of the separate channel openings 74' and 74" in the bottom of the spool and pushed upwardly through their respective channel portions and out through the opposed ends of the channel 74 and aligned eyelets. To wind the line onto the spool 16, it is only necessary to rotate the spool forwardly with respect to the housing, i.e., in the direction of rotation of the trimmer head 10 during use in the drive mode.

Figure 14A:
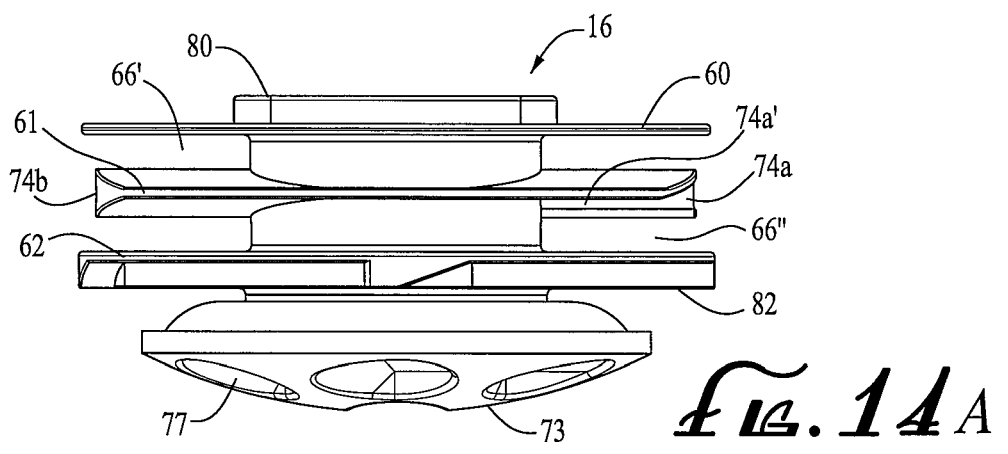
FIG. 14A is a side view of the spool of the trimmer head shown in FIGS. 1-6C.
Figure 14B:
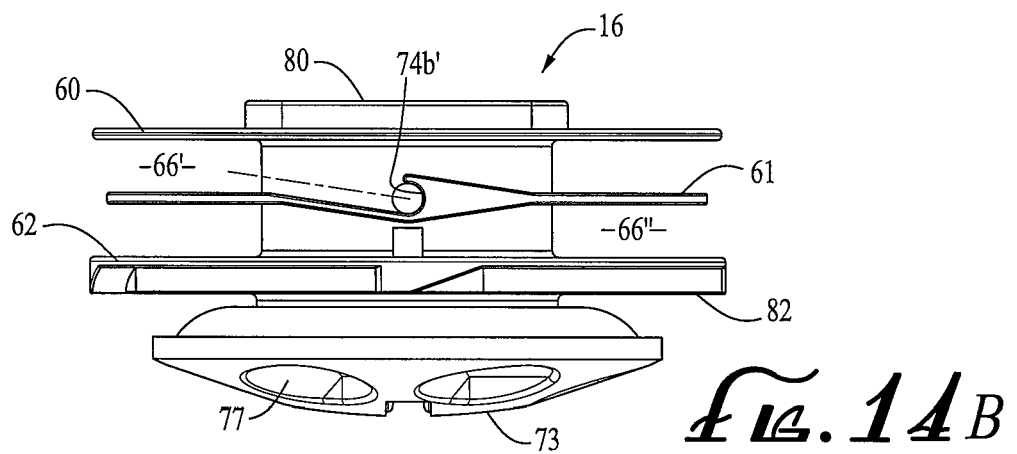
FIG. 14B is a front view of the spool of the trimmer head shown in FIGS. 1-6C as viewed from the left side of FIG. 14A.
Figure 14C:
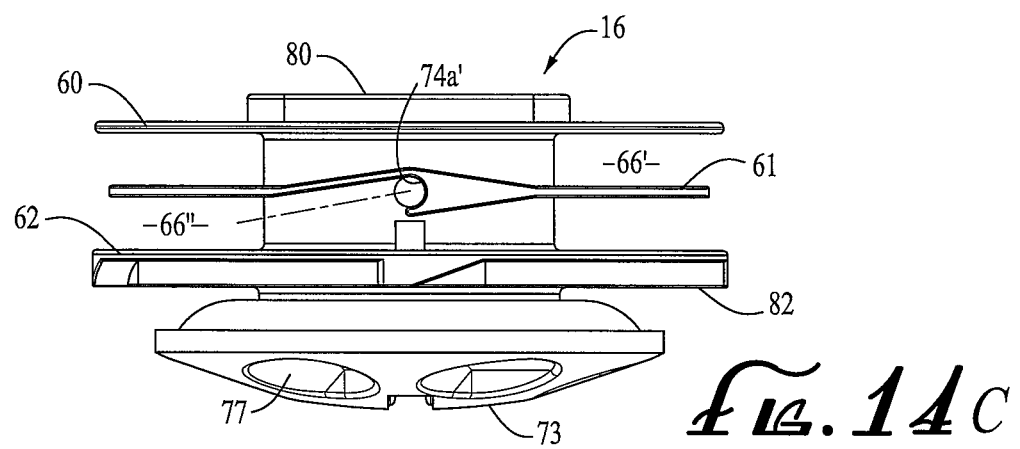
FIG. 14C is a rear view of the spool of the trimmer head shown in FIGS. 1-6C as viewed from the right side of FIG. 14A.
Figure 16:
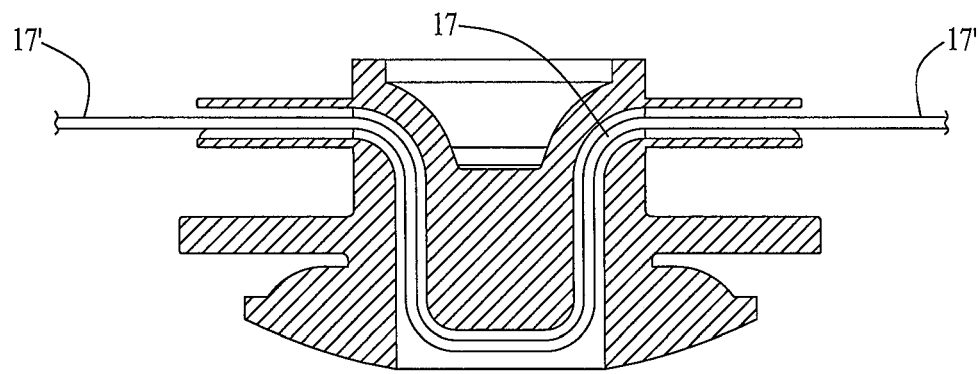
FIG. 16 is a perspective, sectional view of an alternate embodiment of a spool for use in the present invention.

To assist in the winding of the cutting line 17 on to the spool 16 such that the portions of the line projecting from each of the two eyelets is drawn back into the separate spool storage areas 66' and 66" and wrapped about the spool as illustrated in FIG. 6C, the opposed ends 74a and 74b of the line receptor channel are configured by the middle spool flange 61 to direct the opposed portions of the line into the different spool areas. This can be accomplished by removing portions of the channel wall defined by flange 61 adjacent to the two channel ends such that lateral openings 74a' and 74b' are formed in the side wall, communicating channel end 74a with area 66' and channel end 74b with area 66" as shown in FIGS. 14A-14C. By inserting one's thumb and fingers into recesses 77 in the lowermost surface 73 of the spool and rotating the spool in a clockwise direction using recesses 77, while holding the housing stationary with the head in an inverted position (i.e., with the lower spool end 73 facing upwardly), the portion of the trimmer line 17 projecting from the open end 74b of the line receptor is directed into the upper spool storage area 66' and the portion of the trimmer line projecting from channel end 74a is directed into the lower line storage area 66" (see FIG. 14C). Other guide surface configurations could also be employed to direct the opposing line portions into the different spool chambers or storage areas 66' and 66".

By recessing the portion 76 of the lower end of the spool through the exposed portion 74c of the line receptor channel extends, the exposed line is protected when the rapidly rotating head is bumped against the ground to pay out fresh lengths of line through the eyelets 32. If desired, additional protection can be afforded by, for example, a protective bridge, a removable cap or other protective element (not shown) that would allow the user to access the trimmer line extending thereover in channel portion 74c. Any such protective element should be configured so as to provide a continuous curvilinear surface consistent with the contour defined by the lower spool surface 73 and the adjacent outer lower housing surface 45. Such a protective element may be particularly desirable for use on abrasive terrain such as gravel.

When the spool 16 is gripped and rotated relative to the housing as described above, the lower slide surfaces 82b on the lower cam follower 82 will contact the upwardly inclined foot portions 58' and surfaces 58" on the lower projections 58 in the lower portion of the housing and ride upwardly over the inclined surfaces (see FIG. 10B), causing the spool to translate upwardly with respect to the housing and compressing the coil spring 18. As the manual rotation of the spool continues, the corner portions of the lower cam follower 82 can ride over and clear the leading ends of projections 58 in the lower portion of the housing, whereupon the spring causes the spool to snap downwardly such that the lower projections and lower cam abutment surfaces are again in planar alignment. Thus, this reciprocating movement of the rotating spool, which, although not necessary, is preferably employed in the present invention to provide for an even distribution of the cutting line in the two storage areas 66' and 66" about the upper body of the spool. As a result, the lengths of line tend to roll over themselves and fill the two spool areas without becoming entangled on the spool. Because the upper slide surfaces on the upper projections 44 and the leading (slide) surfaces 80b on the upper cam follower 80 are in abutment, it may prove desirable to incline the trailing surfaces 44b of the upper projections 44 and/or the leading (slide) surfaces 80b of the upper cam follower 80 to provide smoother rotation of the spool with respect to the housing during the loading of the line.

The above description of the trimmer head 10 and its components is based on using the head on a conventional rotary trimmer in which the gear box (not shown) typically imparts a counterclockwise rotation to the drive shaft 12 and thus to the trimmer head as viewed from above. If the head were used on a trimmer without a gear box or with one that imparted a clockwise rotation to the head, the leading and trailing surfaces on the cams and cam follower abutment members would simply be reversed. Accordingly, the orientation of the cam features and slide surfaces could be reversed to accommodate a rotary trimmer in which the gear box imparts a clockwise rotation to the drive shaft 12.

The bump-feed mechanism provided by the cams and cam abutment surfaces need not be limited to square cam followers. The same is true of trimmer head 10. The upper and lower cam followers formed by upper and lower portions of the spool, for example, could be three or five sided. Three and five sided cam followers would cooperate with an equal number of cam abutment members in the upper and lower housings as shown in the referenced drawings. The function, cooperation and operation of such cams and cam followers would be otherwise essentially unchanged from that described above.

In the embodiment of the spool employed in the trimmer head shown in FIGS. 1-6C and 11A-12C, the line receptor channel 74 is formed by affixing a pair of channel forming or line guide inserts 90 in the interior of the spool. Spool 16 is preferably foamed by an injection molding process and by using inserts 90 to form the line receptor channel 74, the cost of manufacturing the spool is substantially reduced. Alternately, the same channel configuration could be obtained without the need for inserts 90 in a single-piece construction, albeit at a substantially higher cost. Such a spool 116 is illustrated in FIG. 12D. Other than its method of manufacture, spool 116 is substantially identical to spool 16. In the spool 16 (see, e.g. FIGS. 4 and 12A) a pair of generally rectangular, radially spaced, axially extending, slots 92 are provided in the interior of the spool. The slots 92 are configured to receive inserts 90 such that the end surfaces of the slots cooperate with inner end surfaces on the inserts to define the portions of the line receptor channel 74 disposed with the body of the spool. In the embodiment shown in the drawings, each insert 90 defines an upper concave end surface 91' that merges along a curvilinear end surface 91" into a substantially vertical concave end surface 91'''. Upon affixing inserts 90 in slots 92, the concave end surfaces 91'-91''' of the inserts and the adjacent interior surfaces of the spool thus define surrounding wall for the interior portions of the line receptor channel 74. The inserts 90 and the spool 16, like housing 14, are preferably both formed of a polyamide (nylon 6), 15% glass reinforced material, although other materials could be used. Currently, the inserts 90 are molded separately from and prior to the spools to allow for a natural shrinkage of the inserts as the material cools. The inserts are then inserted into the freshly molded spool in a relatively tight fitment such that the subsequent shrinkage of the spool as it cools, locks the inserts in place. It has been found that roughening the adjacent contract surfaces of the inserts 90 and the walls about slots 92 helps prevent any slippage of the inserts during fabrication. Providing small crushable ribs 90' on the adjacent contact surfaces have been found to inhibit any slippage of the inserts (see FIG. 12A). Also, a small lateral rib (not shown) can be provided on the extended end surfaces of the inserts that are received in mating recesses formed in the outer walls of the slots into which the line guides are inserted. A depending foot portion (also not shown) can be formed at the lower outer end of each insert such that upon insertion of the line guide insert into the freshly molded spool, the spool will cool and shrink not only against the insert, but about the foot, enhancing the securement of the insert within the spool. Adhesives and other attachment means also could be used and, as noted above and illustrated in FIG. 12D, the spool could alternatively be molded of a single-piece construction.

In the event that the cutting line were to break during use proximate one of the eyelets 32, the trimmer line inwardly adjacent the break retracts into the head so that additional fresh line cannot be payed out by simply bumping the head on the ground. With the present invention, the user can grasp the portion of the cutting line extending across the open or exposed portion 74c of the line receptor channel 74 and pull the line downwardly as illustrated in FIGS. 15B and 15C. The downward pulling on the line in a direction parallel, if not coincident to the axis of rotation of the spool, will effect an unraveling of the line off the spool, allowing all of the line to be pulled downwardly from the spool through the laterally-spaced openings 74' and 74" in the bottom of the spool. Thus, the old line can be removed from the trimmer head without having to split the head (remove the spool from the housing) or otherwise interrupt the operative connection between the spool and the housing. The removed line or a new length of fresh line can then be re-loaded onto the head using the line receptor channel as earlier described, again without having to split the head.

The spools illustrated in FIGS. 1-15C are dual area spools in which the portion of the line extending from one eyelet is wrapped about one area of the spool or spool chamber (e.g. 66') and the portion of the cutting line exiting another eyelet is wrapped about another of the spool (e.g. 66"). It is to be understood that the present invention could also be employed with a single chamber spool such as that illustrated in FIG. 16.

To enhance significantly the aerodynamics of the low profile shape of trimmer head 10 during use, aerodynamic features, are provided in the outer head surfaces. By configuring the aerodynamic features so as to move air outwardly from the rapidly rotating head in and about the plane of the extended cutting line and in a forward inclination in the direction of head rotation (see FIG. 6D), the relative velocity between the air and the rotating length(s) or portions 17' of cutting line 17 projecting from the head is reduced as compared to the length(s) of rotating line moving through still air, significantly reducing the aerodynamic drag on the projecting line and thereby significantly reducing the drag on the rotating head. As a result, the trimmer head can run at a higher velocity with the same input drive or the same velocity with a lower input drive, saving energy. This increase in efficiency is particularly significant for lower end rotary trimmers having less torque. Also, the aerodynamic features that move the air outwardly from the head to significantly reduce the drag on the line can draw that air downwardly about the axis of rotation from above the head (see FIGS. 6E and 6F) such that the air can first flow about the trimmer head drive mechanism 11 on the rotary trimmer, which is positioned proximate the upper end of the trimmer head, providing a beneficial cooling effect on the drive mechanism (i.e., about the gear box 11' of a gasoline powered rotary trimmer (see FIG. 6E) or about the motor and batteries (collectively identified at 11" in FIG. 6F) of an electric trimmer). To facilitate such cooling, the conventional gear box 11' on a gasoline powered rotary trimmer could be provided with exterior cooling fins 11a and the cover 11c surrounding the batteries and motor 11' on an electric trimmer should be provided with a plurality of louvers 11c or other appropriate openings therein to allow the cooling air flow to pass therethrough. Further, by maintaining the air flow moved outwardly and forwardly from the head in a generally horizontal disposition about the plane of the extended cutting line such that the length(s) of rotating cutting line projecting from the housing are continuously traveling within the forwardly directed air flow, not only is the drag on the rotating line significantly reduced, but also the line is maintained in a substantially planar disposition to effect an even cutting of the vegetation. Vibration in the line and noise also are reduced.

Figure 17A:
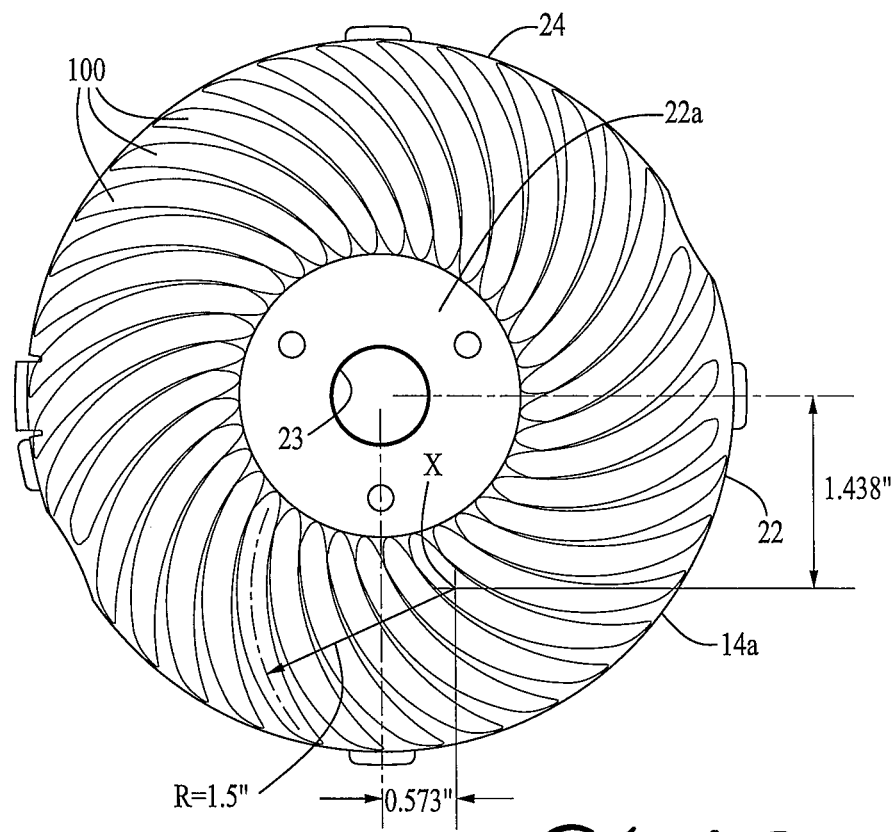
FIG. 17A is a top plan view of the upper portion of the housing of the trimmer head shown in FIGS. 1-6C and illustrating various dimensional parameters of the aerodynamic troughs formed therein.

In the above disclosed embodiment of trimmer head 10, the curvilinear outer head surface 24 defined by the upper portion 14a of the trimmer head housing 14 is provided with a plurality of uniformly spaced and angularly disposed arcuate troughs 100 formed into a turbine-like pattern about surface 24 (see, e.g., FIG. 17A). Troughs 100 are preferably configured and arranged to draw air downwardly during use from above the central portion of the head onto the upper surface 24 of the rapidly rotating head, providing the above described cooling effect on the trimmer drive mechanism. The troughs 100 then drive the air outwardly and downwardly from the head at a forward inclination in the direction of rotation of the head (see FIG. 6D). As troughs 100 direct air outwardly in a forward and slightly downward inclination, the trimmer head 10 preferably positions the generally horizontal annular upper end surface 47" of the lower housing portion 14b outwardly of the opposed slots 30 in the upper housing portion 14a such that surface 47" is disposed adjacent to and slightly below (e.g. about 0.125 in.) the bottom of the line outlet apertures in eyelets 32 so that the air abuts and is directed by surface 47" outwardly in a relatively flat disposition about the plane of the extended length(s) of cutting line during rotation of the head (see FIG. 6E). Thus, the troughs 100 will create a relatively flat zone of air 400, approximately 0.5 inches thick, that projects at a forward inclination from the trimmer head (see FIG. 6D), the lower boundary 402 thereof being substantially defined by the positioning of surface 47" on the upper end portion 47 of the lower housing 14b. As a result, during use, the entire length(s), or at least substantially the entire length(s) 17', of the rapidly rotating cutting line projecting from the housing 14 are effectively maintained within the forwardly moving zone 400 of air created by troughs 100 which further enhances the effectiveness of the trough generated air flow in reducing the drag on the line. It also has been found that the air flow generated by troughs 100 reduces the aerodynamic drag on the upper portion of the housing, further contributing to the reduction of the drag on the head during use. In addition, by directing the air flow about at least substantially the entire length(s) of the extended line as above described, the projecting line remains substantially planar during use to provide an even cutting of the vegetation and, as noted above, line vibration is reduced as is the noise generated by both the line and the rotating head.

While the annular upper end surface 47" of the lower housing portion 14b is illustrated and described as being generally horizontal and interrupted solely by locking tab slots 50 and troughs 104, it is to be understood that alternate surface configurations could be employed. For example, surface 47" could be smooth, without any troughs or other aerodynamic elements formed therein. The surface could be angled upwardly or downwardly to vary the elevation of the outwardly and forwardly moving zone of air 400 relative to the trimmer head to better accommodate different head configurations. Other modifications in the surface 47" might also be employed. While the surface could be eliminated as an aerodynamic element, it is preferably employed as above described and for the reasons stated.

In a presently preferred configuration, troughs 100 are generally V-shaped in cross-section, inclined forwardly with respect to the horizontal, and extend downwardly and forwardly (with respect to the rotational direction of the head—counterclockwise as shown in the drawings) along curvilinear paths from an upper inner portion of surface 24 to a lower outer portion thereof. By way of example, a forward trough inclination of about 54° has been employed (see FIGS. 17A-C). Such a configuration has been found to move the air off surface 24 at a forward inclination within the range of about 30 to 40 degrees in the direction of rotation as illustrated in FIG. 6D. As will be later described, the curvature defined by troughs 100 can be a segment of a constant radius circle. Also, because sharp edges are preferably avoided on the surfaces of trimmer head 10 for aerodynamic reasons, such edges, including the edges and bottoms of the troughs, are typically radiused as shown, for example, in FIGS. 1 and 2. Accordingly, the term "generally V-shaped troughs", as used herein, includes recesses that are curvilinear or generally U-shaped in cross-section.

Figure 18A:
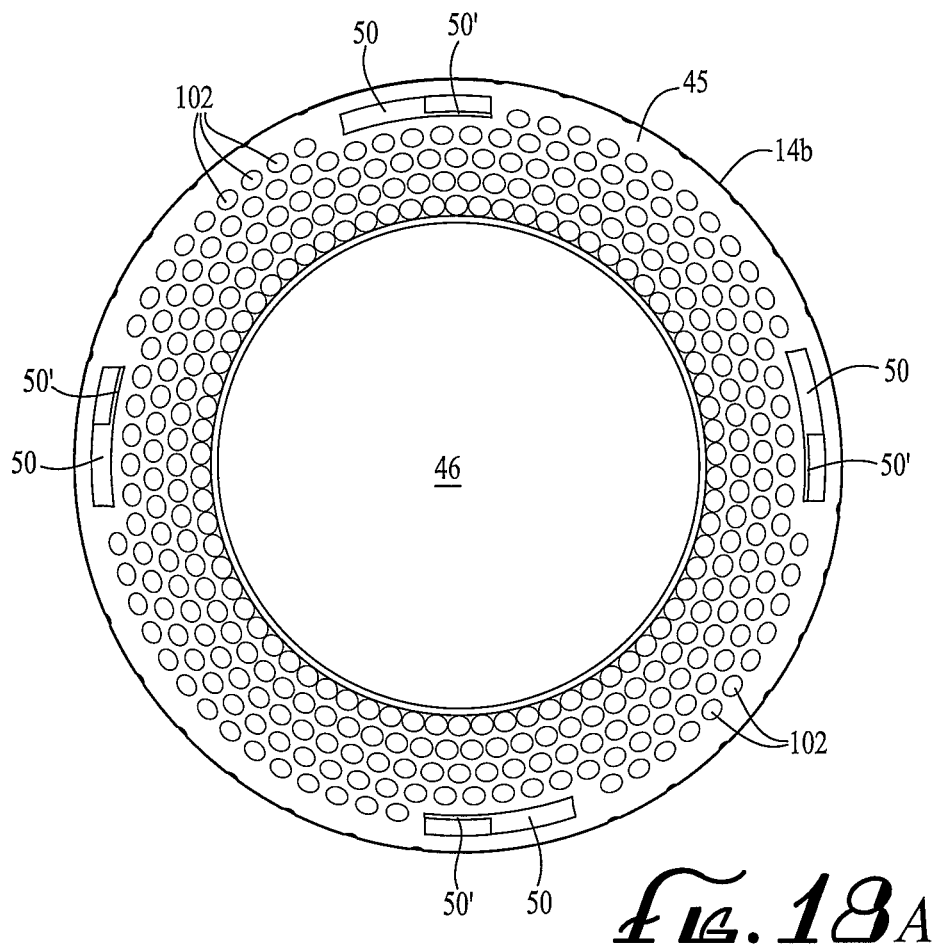
FIG. 18A is a bottom plan view of the exterior of the lower portion of the housing of the trimmer head shown in FIGS. 1-6C.
Figure 18B:
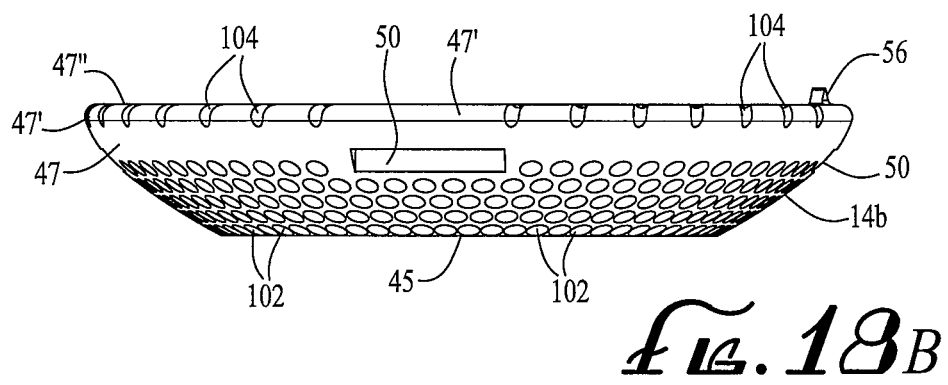
FIG. 18B is a side view of the exterior of the lower portion of the housing of the trimmer head shown in FIGS. 1-6C.

Supplementing troughs 100 are a plurality of dimples 102, preferably of a circular configuration, that are formed in the lower annular surface 45 of the housing, circumscribing the ground abutment surface 73 of spool 16. The dimples 102 in surface 45 are preferably arranged in a plurality of staggered, radially spaced, concentric rings, as seen in FIG. 18A, to minimize the flat surface areas between the dimples. So positioned, the dimples 102 break up the air boundary adjacent the lower housing surface on which they are formed, reducing the areas of laminar flow adjacent the head and thereby further reducing the drag on the head. Dimples 102 will move less air than the troughs 100 in the upper housing portion, but are preferably utilized on the lower portion of the housing so as not to overly disturb the vegetation disposed below the head and thereby adversely impact the uniform cutting of the vegetation with the cutting line 17.

To further enhanced the stability of the extended cutting line during use, aerodynamic elements 104, preferably in the form of relatively small, angularly disposed troughs or channels, can be provided in the upper end portion of lower portion 14b of the housing. Troughs 104 are configured so as to offset the line lifting effect of the upper troughs 100. Troughs 104 extend outwardly at a rearward inclination θ of about 28 to 29 degrees (see FIG. 8A) about the annular surface 47" at the upper end of the lower housing portion 14b and through the adjacent radiused surface 47', as seen in FIGS. 1 and 3. So positioned and configured, troughs 104 direct a relatively stable flow air outwardly from the housing and slightly downwardly, under the extended cutting line 17.

It has been found that by so directing the air flow about the lower portion of the rotating housing and the extended cutting line utilizing the dimples 102 and troughs 104, in combination with the forwardly inclined outward flow directed by the larger troughs 100 on the upper head surface 24 and by the upper end portion 47 of the lower portion of the housing, the drag on the head and particularly on the extended cutting line is substantially reduced and the air pressure above and below the extended cutting line appears relatively balanced as the extended line remains substantially planar during use to provide an even cutting of the vegetation. Testing has shown that trimmer head 10 using 0.095 in. diameter twisted nylon cutting line requires 24.5% less power (217 watts vs. 275) to drive trimmer head 10 at about 5,000 rpm than an identically shaped head and equipped with the identical 0.095 in. cutting line but without troughs 100 and 104 and dimples 102. At approximately 7,000 rpm, the power savings was 24.5% (492 watts vs. 652).

Figure 17B:
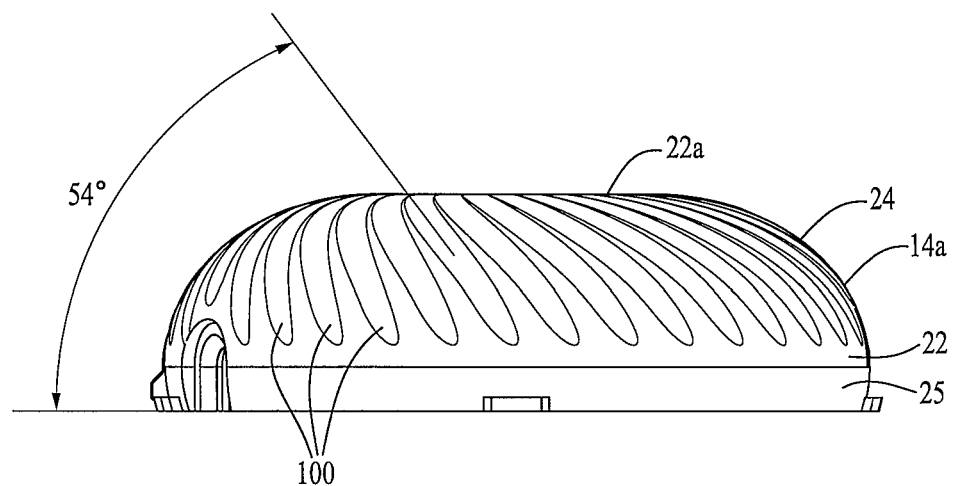
FIG. 17B is a side view of the upper portion of the housing illustrating various dimensional parameters of the aerodynamic troughs formed therein.
Figure 17C:
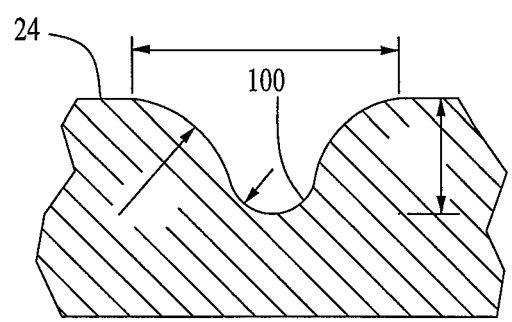
FIG. 17C is a partial sectional view of the upper portion of the housing of the trimmer head shown in FIGS. 1-6C showing the configuration of the aerodynamic troughs formed therein.

By way of example, in a trimmer head 10 having a maximum height of 2.750 inches as measured along its central axis Y (axis of rotation) and a diameter of 5.600 inches, the troughs 100 formed in the arcuate upper surface 24 of the head are configured and oriented so as to each define a radius of about 1.50 inches as measured from a point X as seen in FIG. 17A, located on surface 24 1.438 inches below a horizontal line extending through the axis of rotation of the head and along a first vertical line located 0.573 inches to the right of a second vertical line extending through the axis of rotation of the head. Thirty-six such troughs are formed in surface 24 separated by an arc 10° as measured from the axis of rotation. The troughs 100 are generally V-shaped in cross-section and each of the troughs is angularly inclined toward the trailing edge of the trough at an angle of about 54° as illustrated in FIGS. 17B and 17C. The troughs range from about 0.090-0.150 inches across and from 0.040-0.065 inches in depth. The spacing between the troughs ranges from about 0.150-0.175 inches. The dimple pattern on lower surface 45, as noted above, is evenly and uniformly distributed and each dimple defines a diameter within the range of 0.090-0.125 inches and a depth of 0.009-0.015 inches. The spacing between the dimples should be at a minimum and the molded dimples should have no undercut areas. The troughs 104 are fewer in number than troughs 100 in the upper surface of the housing due to the presence of slots 50. In the illustrated example, there are 27 troughs 104 spaced about annular surfaces 47 and 47'. The troughs 104 are angled about 10° apart at a rearward angle of inclination of about 28-29 degrees. The troughs are spaced approximately 0.300 inches apart and each trough defines a width of about 0.100 inch and a depth of about 0.025 inch. The angular orientation of the troughs 104 is illustrated in FIG. 8A.

Figure 19:
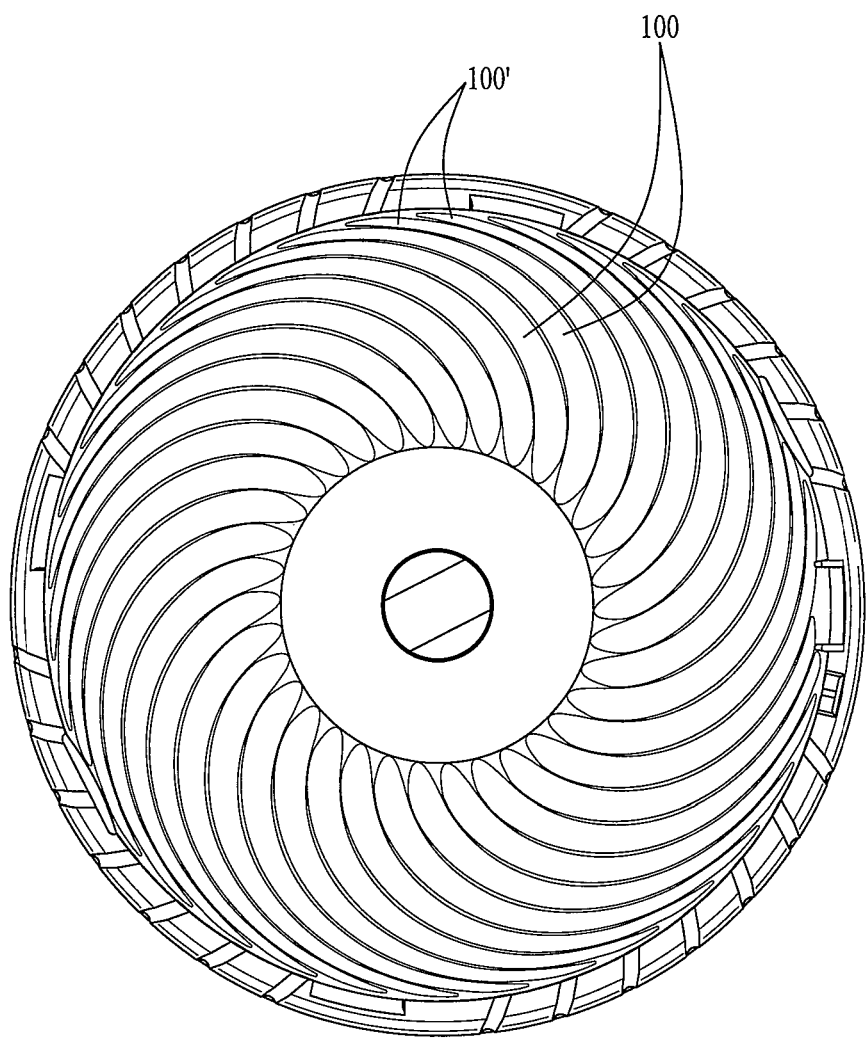
FIG. 19 is a top plan view of an alternate embodiment of the aerodynamic features in the outer surfaces of the housing of the present invention.
Figure 20A:
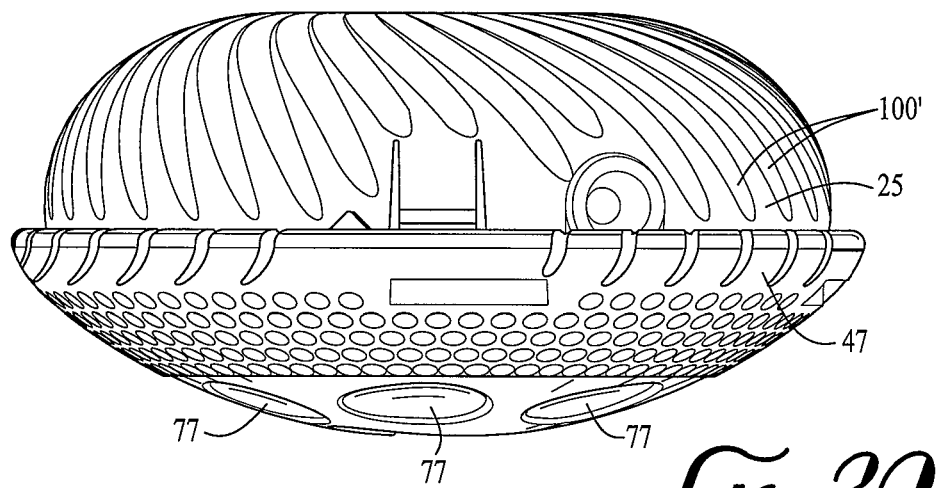
FIG. 20A is a side view of another alternate embodiment of the aerodynamic features in a trimmer head of the present invention.
Figure 20B:
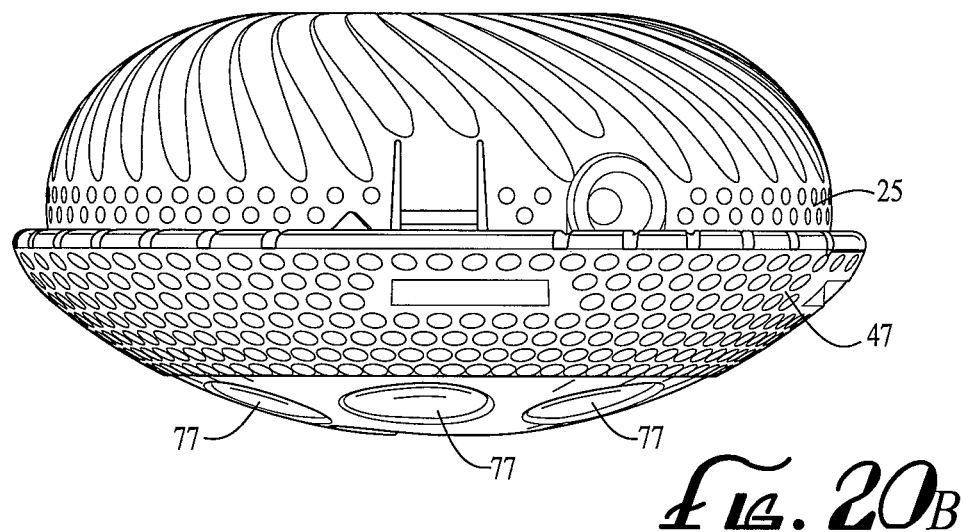
FIG. 20B is a side view of yet another alternate embodiment of the aerodynamic features in a trimmer head of the present invention.

The above dimensions and configurations of the trimmer head 10, troughs 100 and 104 and dimples 102 are by way of example only. Other trough and dimple sizes and shapes and combinations thereof could also be employed. It has been found that while the above described angular disposition of troughs 100 and 104 facilitate the molding of the upper housing portion of the head, it may be preferable to configure the troughs 100 on the upper surface of the trimmer head housing such that they do not trace a constant radius but form a tighter curvature in the lower end portions 100' thereof as shown in FIG. 19. Additionally, dimples and/or troughs could be provided in the lower skirt portion 25 and/or upper end portion 47 of the upper and lower housing portions as shown, for example, in FIGS. 20A and 20B. Again, other configurations and dimensional changes in the aerodynamic features could be employed.

Figure 21:
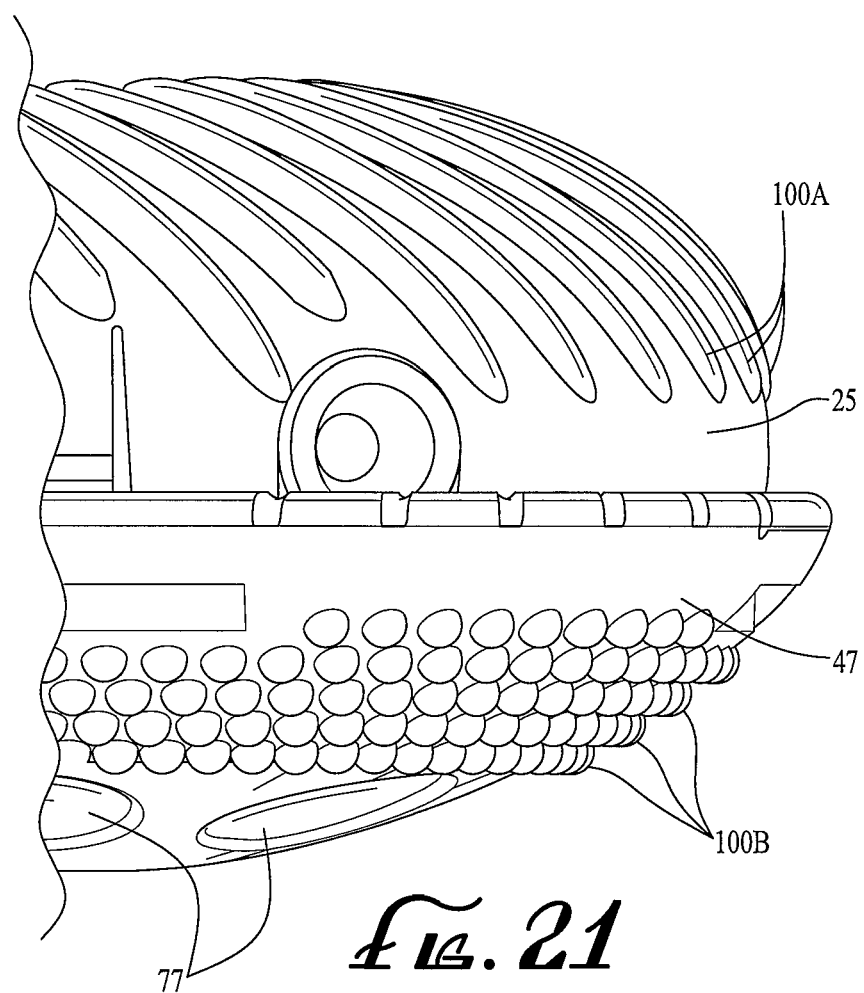
FIG. 21 is a partial side view of still another alternate embodiment of the aerodynamic features in a trimmer head of the present invention.

Aerodynamic features in the form of protruding elements, if appropriately configured spaced and sized, such as raised ridges 100A and bumps 102A, could be employed in the present invention in lieu of or in addition to immersed cavities such as troughs and dimples to reduce the frictional drag on the head and line (see FIG. 21). As with the use of troughs and dimples, a variety of shapes and sizes of ridges, bumps and/or other protruding elements should be suitable for use in the outer surfaces of the trimmer head to effect the desired air movement and the resulting reduction of drag on the head and line. Indentations in the form of troughs and dimples are preferred over protruding elements from a cost standpoint as the formation of cavities requires the use of less material, whereas the addition of air directing protrusions requires the use of more material.

In certain instances wherein the cooling of the trimmer head drive mechanism may be of primary concern, the aerodynamic elements on at least the upper head surface could be configured to enhance the downward flow of cooling air about the trimmer drive mechanism while providing little or no reduction in aerodynamic drag on the trimmer head during use. Such an application could include large electric rotary trimmers in which the operating lives of the batteries and electric motors are of primary concern and could be meaningfully extended by adequate cooling. More typically, however, such elements would continue to provide both a reduction in the aerodynamic drag on the head and a cooling air flow for the drive mechanism.

Figure 2:
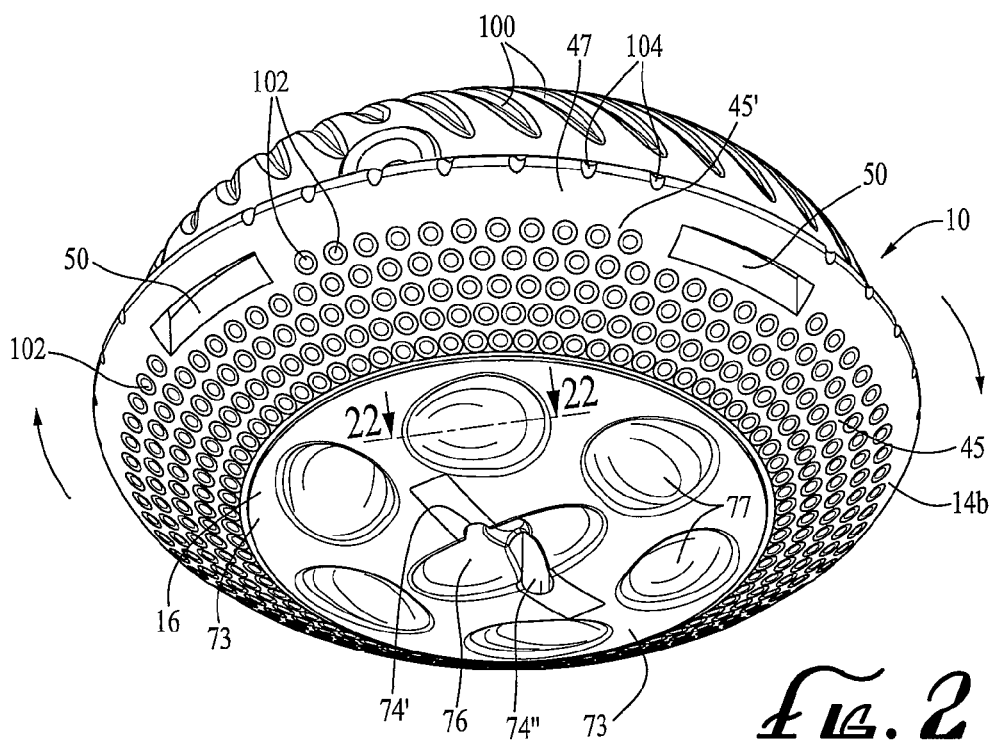
FIG. 2 is a perspective view of the embodiment of the trimmer head illustrated in FIG. 1 as seen from below.
Figure 22:
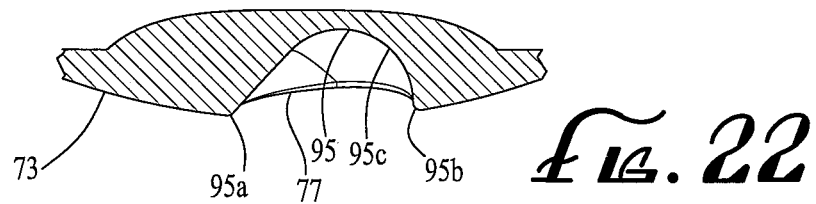
FIG. 22 is a sectional view of one of the finger/thumb receiving recesses in the lower end of the spool in the trimmer head shown in FIGS. 1-6C.

As seen, for example, in FIGS. 2 and 22, and as noted above, the lowermost surface 73 of the spool 16 in trimmer head 10 has a plurality of finger and thumb receiving recesses 77 formed therein for rotating the spool 16 with respect to the housing 14 to effect the winding of the cutting line 17 onto the spool in the manner described above. To minimize the turbulence created by the rapidly rotating head in the area within and adjacent to those gripping recesses 77, the lower or bottom surface 95 of each recess is inclined upwardly into the spool from the trailing edge 95a of the recess to the leading edge 95b thereof so as to define a substantially vertically surface 95c at the leading edge of each recess and a lower bottom surface 95 that slopes downwardly from the bottom of surface 95 to the lowermost surface 73 of the spool, as shown in FIG. 22. This configuration both provides a pushing surface 95c to enable the user to grip and rotate the spool within the housing in the rotational direction of the head while holding the housing stationary to effect the winding of the line 17 onto the spool and prevents the trailing sides of the gripping recesses from functioning like an air dam and trapping air within the recesses, creating turbulence and slowing the rotational speed of the head. This configuration also allows the user only to wind the spool in one direction obviating the need for directional indicia on the exposed bottom surface 73 of the spool where room is limited.

While the aerodynamic features of the present invention have been disclosed in connection with a trimmer head 10 of the bump-feed type having a particular line feeding mechanism and line winding mechanism, a variety of such mechanisms could be employed with the aerodynamic features of the present invention. Also, as noted earlier herein, the present invention is not limited to heads of the bump-feed type but could be employed with manual heads, automatic heads and fixed line heads.

Figure 23A:
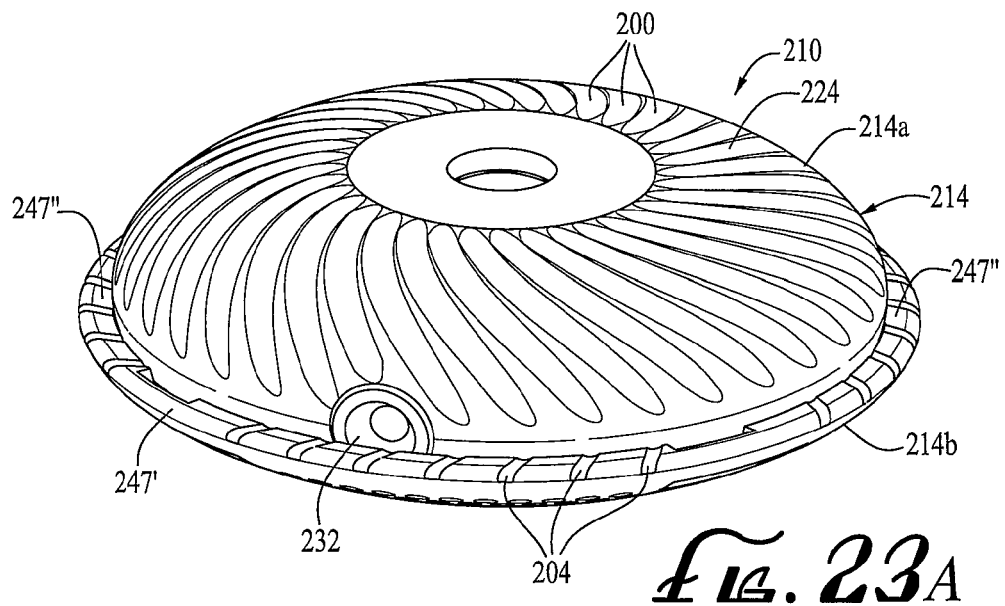
FIG. 23A is a perspective view as seen from above of the application of the present invention to a fixed line head.
Figure 23B:
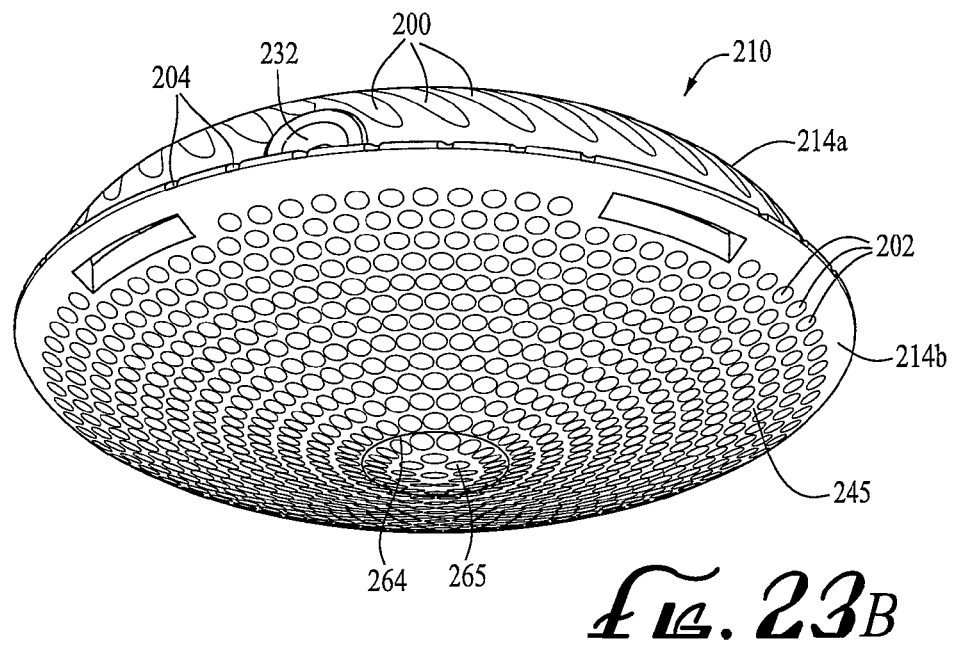
FIG. 23B is a perspective view as seen from below of the application of the present invention to the trimmer head shown in FIG. 23A.
Figure 23C:
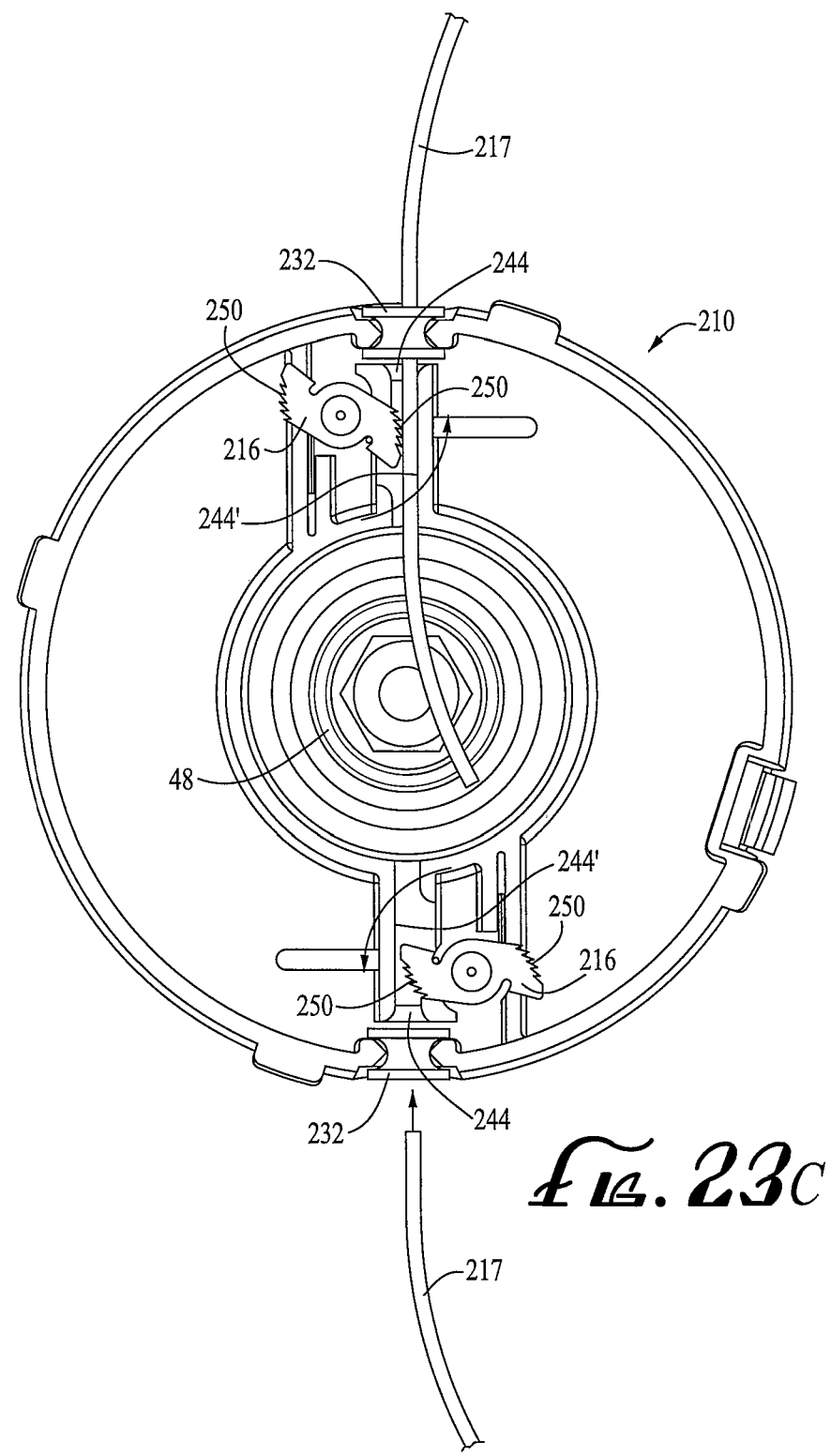
FIG. 23C is a bottom plan view of the upper housing portion of the trimmer head shown in FIGS. 22A and 22B.

FIGS. 23A-23C, for example, illustrate the use of the present invention in a fixed line head 210. As seen therein, the aerodynamic elements in the upper and lower housing portions 14a and 14b of the previously discussed trimmer head 10 can be employed in the upper and lower housing portions 214a and 214b of the housing 214 of the fixed line head 210. Again, the upper and lower housing portions 214a and 214b are configured and mated together so as to provide head 210 with a generally elliptical, aerodynamic low profile configuration. Because a fixed line head does not include an interior spool, the profile of head 210 may be slightly flatter than head 10.

As with trimmer head 10, the upper housing portion 214a of head 210 may be provided with troughs 200 on the upper surface 224 thereof that can be configured like troughs 100 in the upper portion 14a of head 10. Similarly, the lower housing portion 214b can be provided with a plurality of dimples 202 in the lower housing surface 245, that can be of the same configuration and positioned in the same general patterned array as dimples 102 in the lower housing portion 14b of head 10, except that as seen in FIG. 22B, dimples 202 can cover a larger surface area than dimples 102 as the available surface area is larger. The access opening 264 in the underside of the housing portion 214b on the fixed line head is smaller than the central opening 46 for the spool 16 in the lower end of housing portion 14b of head 10. The access opening is provided in fixed line head 210 to enable the user to grasp the inwardly extended end portions of the lengths of cutting line and to pull the line inwardly through the eyelets 232 and out of the housing through opening 264 as will be briefly described. To provide the lowermost portion of the lower housing portion with a continuous curvilinear configuration, a removable cap 265 is provided to cover aperture 264 to prevent the creation of turbulence proximate the lower end of the head. The outer surface of cap 265 also can be provided with dimples 202, as shown in FIG. 23B.

The lower housing portion 214b also preferably includes a plurality of arcuate troughs 204 positioned in the upper end portion of the lower portion 214b of housing 210. As with trough 104 in head 10, troughs 204 are configured so as to project in the opposite direction of the troughs 200 in the upper housing portion (i.e., forwardly as opposed to rearwardly) and extend through the adjacent radiused surface 247' and generally horizontal surface 247" to direct a relatively stable flow of air outwardly from the housing and downwardly under the extended cutting line, as do troughs 104 in head 10. As with head 10, various changes can be made in the size, configuration and positioning of the aerodynamic elements in head 210.

While not part of the present invention, the mechanism for loading, gripping and replacing the cutting line 217 in head 210 is described in detail in U.S. Pat. No. 6,928,741 and illustrated in FIG. 23C. As seen therein, short lengths of cutting line 217 project through opposed eyelets 232 and into aligned radial channels 244 within the head 210. The lengths of line are held in place by a pair of spring-biased toothed cams 216 that press the inner end portions of the line against channel walls 244'. To remove the line when it becomes damaged or worn, the line is simply pulled inwardly and downwardly through the central opening 264 in the lower housing portion 214b of the head. Opening 264 is axially aligned with central area 48 in the upper housing portion, providing access to the end portions of the lengths of cutting line. Due to the angular configuration of the locking cams 216 and teeth 250 formed thereon, the cams allow for the sliding movement of the line inwardly through channels 244 to load the lengths of line on the head, hold the line in place during use and allow the line to be pulled inwardly for removal and replacement.

While the present invention has been illustrated and described in connection with a bump-feed head 10 and a fixed line head 210, those particular heads were illustrated and described by way of example only. As noted earlier, the present invention is not limited to a particular type or types of trimmer head or heads having a particular drive, line feeding, loading or replacement mechanism. Also, as noted earlier, various changes and modifications also may be made to the aerodynamic features of the present invention, including, but not limited to, the shape of the head and the shape, size and location of the aerodynamic elements. For example, very shallow troughs in the form of scoring, as opposed to the deeper cavities or depressions formed, for example, by troughs 100, channels or dimples 102, could be employed in the outer surfaces of the head to reduce the drag on the head during use. While the scoring may not move sufficient air to effect a reduction of the drag on the cutting line during use, it could reduce somewhat the drag on the housing, increasing the speed of rotation and reducing vibration. An example of such a trimmer head 310 is illustrated in FIG. 24.

Figure 24A:
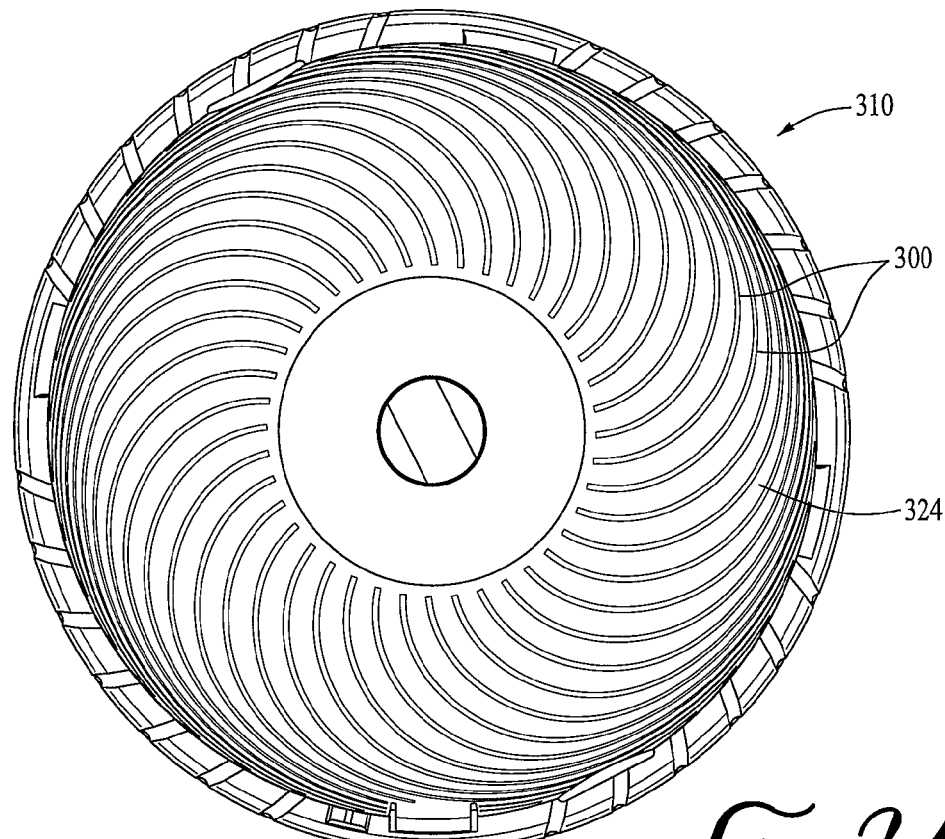
FIG. 24A is a top plan view of still another alternate embodiment of the aerodynamic features in a trimmer head of the present invention.
Figure 24B:
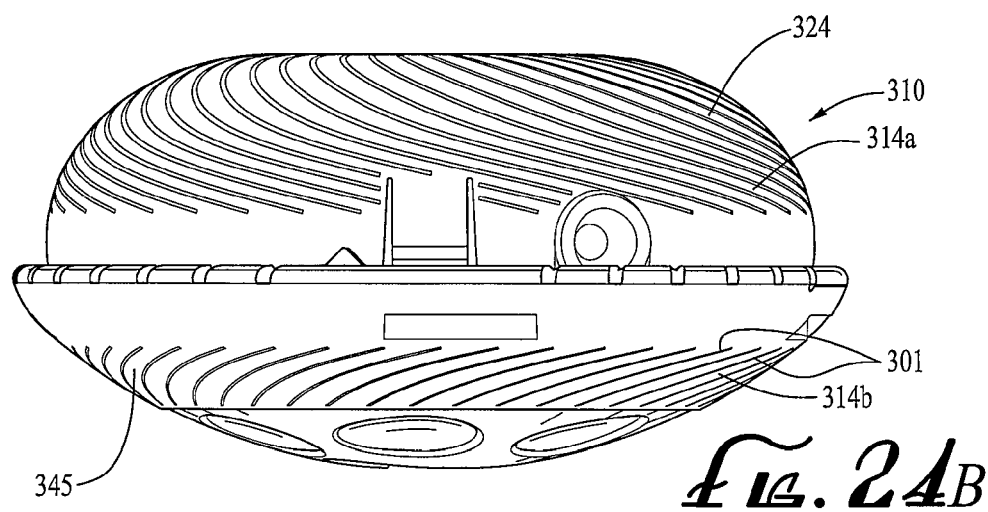
FIG. 24B is a side view of the trimmer head shown in FIG. 24A.

As in the prior embodiments, trimmer head 310 preferably defines an aerodynamic generally ellipsoidal profile, although, again, other head configurations could be employed. As seen in FIGS. 24A and 24B, the upper portion 314a of the trimmer head housing 314 includes aerodynamic elements in the form of score lines 300 tracing a turbine-like pattern. The score lines 300 extend in a closely spaced uniform disposition about upper housing surface 324 such that they trace curvilinear paths extending downwardly and rearwardly from an upper inner portion of surface 324 to a lower outer portion thereof, similar to troughs 100 of trimmer head 10, except that the score lines 300 preferably form a tighter curvature in the lower portions thereof, similar to the end portions 100' of the troughs shown in FIG. 19. The lower housing portion 314b can also be provided with score lines 301 in the lower housing surface 345. The score lines 301 formed in the annular surface of the lower portion 314b of the housing preferably form a mirror image of score lines 300, extending upwardly and rearwardly with respect to the rotational direction of the head as seen in FIG. 24B. As with the troughs and dimples of the prior embodiment, other score line patterns and configurations could be employed to provide the desired aerodynamic effect. While the size of the score lines also could be varied, by way of example, such lines can be about 0.020 in. wide and 0.010 in. deep with a radial spacing of about 0.200 in. at their midpoints. The edges of the score lines 300 and 301 preferably are radiused at about 0.005 in. to avoid the adverse aerodynamic effects created by sharp edges in the outer surfaces of the head. As seen in FIG. 24, the score lines preferably are slightly tighter at their upper end portions than their lower end portions and the opposite is true with respect to the score lines in the lower portion of the housing which are more closely spaced at their lower ends.

As seen from the above description, various changes and modifications can be made in the present invention. Insofar as the above described changes and modifications and/or any other changes or modifications are within the purview of any of the appended claims, they are to be considered as part of the present invention.

What is claimed is:

1. An aerodynamic trimmer head for use in flexible line rotary trimmers, said head comprising:
    a housing adapted to be operatively connected to a rotary trimmer to effect rotation of the head, said housing defining at least one opening therein for the passage of line therethrough such that a length of line can project from said housing during rotation of the head for the cutting of vegetation and including an upper housing portion and a lower housing portion, said upper housing portion defining an upper head surface having an inner upper portion and an outer lower portion and said lower housing portion defining a lower head surface; and
    a plurality of aerodynamic elements defined by at least said upper head surface, said elements being configured so as to direct air outwardly from said head during rotation thereof at a forward inclination in the direction of rotation and about the portion of the line projecting therefrom, thereby decreasing the drag on said line and wherein said aerodynamic elements comprise either a plurality of troughs extending downwardly and forwardly in the direction of rotation from said inner upper portion of said upper head surface to said lower outer portion thereof or a plurality of protrusions extending downwardly and forwardly in the direction of rotation from said inner upper portion of said upper head surface to said lower outer portion thereof.

2. The aerodynamic trimmer head of claim 1 wherein said aerodynamic elements include a plurality of dimples on said lower head surface.

3. The aerodynamic trimmer head of claim 1 wherein said troughs are continuously curvilinear in cross-section.

4. The aerodynamic trimmer head of claim 3 wherein said aerodynamic elements include a plurality of dimples on said lower head surface.

5. The aerodynamic trimmer head of claim 1 wherein said inclined troughs extend along non-linear paths and are generally V-shaped and forwardly inclined.

6. The aerodynamic trimmer head of claim 1 wherein at least a portion of said upper head surface is curvilinear and either said plurality of troughs extend along non-linear paths over said curvilinear portion of said upper head surface or said plurality of protrusions extend along non-linear paths over said curvilinear portion of said upper head surface and including at least one housing surface extending about a perimeter portion of said head exteriorly adjacent to and below said at least one opening in said housing, said housing surface cooperating with said troughs or protrusions during rotation of said head to direct air outwardly from said head at said forward inclination about the length of the portion of the line projecting from said head.

7. The aerodynamic trimmer head of claim 6 wherein said at least one housing surface extending about a perimeter portion of said head comprises an upper end portion of the annular lower head surface, said upper end portion overlaps and is exteriorly adjacent to a lower end portion of said upper head surface and defines said at least one housing surface extending about a perimeter portion of said head.

8. The aerodynamic trimmer head of claim 6 wherein said aerodynamic elements further comprise a plurality of troughs spaced about and extending outwardly through said at least one housing surface extending about said perimeter portion of said head.

9. The aerodynamic trimmer head of claim 8 wherein said troughs in said at least one housing surface extend therethrough at a rearward inclination relative to the direction of rotation of said head.

10. The aerodynamic trimmer head of claim 1 wherein at least a portion of said upper head surface is curvilinear and either said plurality of troughs extend along non-linear paths over said curvilinear portion of said upper head surface, or said plurality of protrusions extend along non-linear paths over said curvilinear portion of said upper head surface, said troughs or said protrusions drawing air downwardly about a central axis of rotation of the trimmer head and onto said upper surface thereof during rotation of said head effecting a cooling of a trimmer head drive mechanism prior to directing said air outwardly from said head and decreasing the drag on the line.

11. The aerodynamic trimmer head of claim 10 wherein said aerodynamic elements include at least one housing surface extending about a perimeter portion of said head exteriorly of and adjacent to and below said at least one opening in said housing, said housing surface cooperating with said troughs or said protrusions during rotation of said head to direct air outwardly from said head at said forward inclination in a substantially planar disposition about the length of the portion of the line projecting from said head.

12. The aerodynamic trimmer head of claim 1 wherein said aerodynamic elements include at least one housing surface extending about a perimeter portion of said head exteriorly of and adjacent to and below said at least one opening in said housing, said housing surface cooperating with said troughs or said protrusions during rotation of said head to direct air outwardly from said head at said forward inclination in a substantially planar disposition about the length of the portion of the line projecting from said head.

13. The aerodynamic trimmer head of claim 12 wherein said aerodynamic elements include a plurality of dimples on said lower head surface.

14. The aerodynamic trimmer head of claim 12 wherein said at least one housing surface extending about a perimeter portion of said head comprises an upper end portion of the annular lower head surface, said upper end portion overlaps and is exteriorly adjacent to a lower end portion of said upper head surface and defines said at least one housing surface extending about a perimeter portion of said head.

15. The aerodynamic trimmer head of claim 1 wherein at least a substantial portion of said upper head surface is curvilinear and said lower head surface is of an annular and generally curvilinear configuration and including a spool disposed within said housing for carrying at least one length of cutting line thereon, said spool being operatively connected to said housing for rotation therewith and wherein said spool defines a generally curvilinear lower spool surface disposed interiorly of and merging into said annular lower head surface such that said upper and lower portions of said housing and said spool collectively provide said head with a generally curvilinear aerodynamic profile.

16. The aerodynamic trimmer head of claim 15 wherein said lower spool surface defines a plurality of finger and thumb receiving recesses therein for use in rotating said spool relative to said housing in a forward direction to effect the winding of line onto said spool, each of said recesses defining a bottom surface extending from a trailing edge substantially flush with said lower spool surface to a recessed forward wall whereby said spool can be rotated relative to said housing by means of said recesses only in the forward direction and aerodynamic drag created by said finger and thumb recesses in said lower spool surface during rotation of said head is reduced.

17. The aerodynamic trimmer head of claim 15 wherein said aerodynamic elements include at least one housing surface extending about a perimeter portion of said head exteriorly of and adjacent to and below said at least one opening in said housing, said housing surface cooperating with said troughs to direct outwardly from said head at said forward inclination in a substantially planar disposition about the length of the portion of line projecting from said head.

18. The aerodynamic trimmer head of claim 17 wherein said aerodynamic elements include a plurality of dimples on said lower head surface.

19. An aerodynamic trimmer head for use in flexible line rotary trimmers, said head comprising:

a housing adapted to be operatively connected to a rotary trimmer to effect rotation of the head, said housing defining a pair of opposed openings therein for the passage of line therethrough and including an upper housing portion and a lower housing portion, said upper housing portion defining a generally curvilinear upper head surface, said lower housing portion being removably secured to said upper housing portion and defining an annular, generally curvilinear, lower head surface;

a spool disposed within said housing for carrying a length of cutting line thereon, said spool being operatively connected to said housing for rotation therewith such that end portions of the line can project from said spool and said housing through said opposed openings in said housing and wherein said spool defines a generally curvilinear lower spool surface disposed interiorly of and merging into said annular lower head surface such that said upper and lower portions of said housing and said spool collectively provide said head with a generally curvilinear aerodynamic profile; and a plurality of aerodynamic elements defined by at least said upper head surface, said elements on said upper head surface including either a plurality of inclined troughs extending downwardly and forwardly in the direction of rotation along curvilinear paths from an upper portion of said upper head surface to a lower portion thereof or a plurality of protrusions extending downwardly and forwardly in the direction of rotation along curvilinear paths from an upper portion of said upper head surface to a lower portion thereof, said elements drawing air downwardly about a central axis of rotation of the trimmer head during rotation thereof to effect a cooling of a trimmer head drive mechanism and onto the upper surface of said head and directing air outwardly from said upper surface at a forward inclination in the direction of rotation and about the portions of the line projecting therefrom, thereby decreasing the drag on said line.

20. The aerodynamic trimmer head of claim 19 wherein said aerodynamic elements include at least either a plurality of dimples or a plurality of rounded protrusions on said lower head surface.

21. The aerodynamic trimmer head of claim 19 wherein said aerodynamic elements include at least one housing surface extending about a perimeter portion of said head exteriorly of and adjacent to and below said opposed openings therein, said housing surface cooperating with said troughs or protrusions during rotation of said head to deflect air directed by said troughs outwardly from said head at said forward inclination in a substantially planar disposition about the lengths of the portions of line projecting from said head.

22. A trimmer head for use in flexible line rotary trimmers, said head comprising:
  a housing adapted to be operatively connected to a rotary trimmer to effect rotation of the head, said housing defining at least one opening therein for the passage of a length of line therethrough such that said length of line can project from said housing during rotation of said head for the cutting of vegetation and including an upper housing portion, said upper housing portion defining an upper head surface and said upper head surface defining an inner upper portion and an outer lower portion;
  a plurality of aerodynamic elements defined by said upper head surface, said elements comprising either a plurality of troughs extending downwardly and outwardly along non-linear paths from said inner upper portion of said upper head surface to said outer lower portion thereof or a plurality of protrusions extending downwardly and outwardly along non-linear paths from said inner upper portion of said upper head surface to said outer lower portion thereof and wherein said elements are configured so as to draw air downwardly about a central axis of rotation of the trimmer head and onto said upper head surface during rotation of said head and direct said air outwardly over said upper head surface and from said head, thereby effecting a cooling of a trimmer head drive mechanism; and
  wherein said non-linear paths extend forwardly in the direction of rotation of said head so as to direct air during rotation of the head outwardly therefrom at a forward inclination about the portion of line extending from said head, thereby decreasing the drag on the line.

23. The aerodynamic trimmer head of claim 22 wherein said aerodynamic elements include at least one housing surface extending about a perimeter portion of said head exteriorly of and adjacent to and below said at least one opening in said housing, said housing surface cooperating with said troughs or said protrusions during rotation of said head to direct air outwardly from said head at said forward inclination in a substantially planar disposition about the length of the portion of the line projecting from said head.

* * * * *